(12) United States Patent
Hersam et al.

(10) Patent No.: US 11,492,720 B2
(45) Date of Patent: Nov. 8, 2022

(54) HIGH-PERFORMANCE SOLID-STATE SUPERCAPACITORS AND MICROSUPERCAPACITORS DERIVED FROM PRINTABLE GRAPHENE INKS

(71) Applicant: Northwestern University, Evanston, IL (US)

(72) Inventors: Mark C. Hersam, Wilmette, IL (US); Ethan B. Secor, Evanston, IL (US); Lei Li, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 27 days.

(21) Appl. No.: 15/646,761

(22) Filed: Jul. 11, 2017

(65) Prior Publication Data
US 2018/0010260 A1   Jan. 11, 2018

Related U.S. Application Data

(60) Provisional application No. 62/360,727, filed on Jul. 11, 2016.

(51) Int. Cl.
| | |
|---|---|
| *H01G 11/84* | (2013.01) |
| *H01G 11/10* | (2013.01) |
| *H01G 11/32* | (2013.01) |
| *H01G 11/86* | (2013.01) |
| *C25D 13/02* | (2006.01) |
| *C09D 5/24* | (2006.01) |
| *C09D 11/52* | (2014.01) |

(Continued)

(52) U.S. Cl.
CPC ............... *C25D 13/02* (2013.01); *C09D 5/24* (2013.01); *C09D 11/00* (2013.01); *C09D 11/324* (2013.01); *C09D 11/52* (2013.01); *H01G 11/10* (2013.01); *H01G 11/32* (2013.01); *H01G 11/84* (2013.01); *H01G 11/86* (2013.01); *Y02E 60/13* (2013.01)

(58) Field of Classification Search
CPC ........ H01G 11/10; H01G 11/32; H01G 11/38; H01G 11/42; H01G 11/84; H01G 11/86; C09D 11/00; C09D 11/324; C09D 11/52; C09D 5/24; C25D 13/02
See application file for complete search history.

(56) References Cited

U.S. PATENT DOCUMENTS

| | | |
|---|---|---|
| 9,079,764 B1 | 7/2015 | Hersam et al. |
| 2010/0021819 A1 | 1/2010 | Zhamu et al. |

(Continued)

FOREIGN PATENT DOCUMENTS

| | | |
|---|---|---|
| EP | 2570462 B1 | 3/2017 |
| WO | 2013074712 A1 | 5/2013 |
| WO | 2014210584 A1 | 12/2014 |

OTHER PUBLICATIONS

Jiang et al. "Miniature supercapacitors based on nanocomposite thin films" (2013). Microelectronic Engineering, 111, p. 52-57 (Year: 2013).*

(Continued)

*Primary Examiner* — Jose I Hernandez-Kenney
(74) *Attorney, Agent, or Firm* — Locke Lord LLP; Tim Tingkang Xia, Esq.

(57) ABSTRACT

Solid-state supercapacitors and microsupercapacitors comprising printed graphene electrodes and related methods of preparation.

Figure 1:
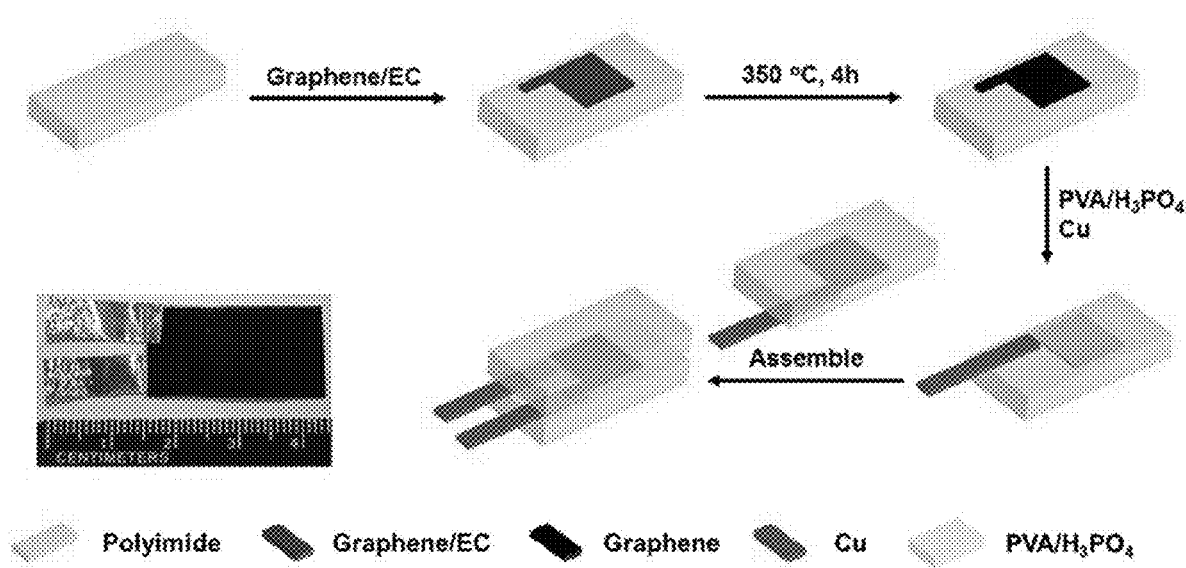

9 Claims, 40 Drawing Sheets
(28 of 40 Drawing Sheet(s) Filed in Color)

(51) Int. Cl.
*C09D 11/00* (2014.01)
*C09D 11/324* (2014.01)

(56) References Cited

U.S. PATENT DOCUMENTS

| | | | |
|---|---|---|---|
| 2013/0033810 A1* | 2/2013 | Crain | C09D 171/02 361/679.32 |
| 2013/0156678 A1* | 6/2013 | Banerjee | B82Y 30/00 423/445 R |
| 2015/0072162 A1* | 3/2015 | Hersam | C09D 11/14 428/473.5 |
| 2015/0307730 A1* | 10/2015 | Hersam | C09D 11/52 430/308 |
| 2016/0133396 A1* | 5/2016 | Hsieh | H01G 11/38 361/502 |
| 2016/0185990 A1* | 6/2016 | Cho | H01B 1/16 252/514 |
| 2016/0200850 A1* | 7/2016 | Hatanaka | C08L 101/06 429/245 |
| 2017/0081537 A1 | 3/2017 | Hersam et al. | |

OTHER PUBLICATIONS

El-Kady, MF. et al. Scalable fabrication of high-power graphene micro-supercapacitors for flexible and on-chip energy storage. Nat. Commun. 4:1475 doi: 0.1038/ncomms2446 (2013)) (Year: 2013).*
International Search Report and Written Opinion for PCT/US2017/041520 dated Jan. 22, 2018, 12 pages.

* cited by examiner

Series

Parallel

HIGH-PERFORMANCE SOLID-STATE SUPERCAPACITORS AND MICROSUPERCAPACITORS DERIVED FROM PRINTABLE GRAPHENE INKS

This invention claims priority to and the benefit of application Ser. No. 62/360,727 filed on Jul. 11, 2016, the entirety of which is incorporated herein by reference.

This invention was made with government support under grant number DE-AC02-06CH11357 awarded by the Department of Energy, grant number FA8650-15-2-5518 awarded by the AFMCLO/JAZ and grant number DMR1121262 awarded by the National Science Foundation. The government has certain rights in the invention.

BACKGROUND OF THE INVENTION

Advances in thin-film energy storage technologies are required to power the emerging field of printed and portable electronics, with applications spanning biomedical and environmental monitoring, flexible displays and logic, and wireless identification and communication to enable the Internet of Things. Supercapacitors (SCs), also known as electrochemical capacitors, represent a promising technology to meet this onboard energy storage requirement. SCs store energy in electrochemical double layers formed by highly reversible ion adsorption processes at the interface between electrodes and electrolyte. All-solid-state SCs are particularly well-suited for portable energy storage due to their excellent power density, suitable energy density, long operational lifespan, straightforward packaging with no liquid components, and versatile form factor compatible with thin-film electronic systems. Since the electrode has a critical impact on the energy storage performance of SCs, significant effort has been devoted to the development and evaluation of electrode materials. Among these materials, graphene is a leading candidate due to its high intrinsic electrical conductivity, resilient mechanical properties, high theoretical surface area, and promising theoretical capacitance.

Several approaches have been developed to prepare graphene-based electrodes for SCs. Chemical methods have been widely used to synthesize chemically-converted graphene, which entail the synthesis of graphene oxide (GO) by the Hummers method or related methods, followed by reduction with hydrazine, $NaBH_4$, $H_2SO_4$, hydrothermal reaction, thermal treatment in inert gas, or laser irradiation. However, the application of chemically-converted graphene in SCs has been hindered by several issues. In particular, the synthesis, post-reaction treatment, and instability of GO present processing challenges for widespread application. In addition, the complex fabrication required for GO-based electrodes limits the cost potential and versatility of devices, particularly for microsupercapacitors (MSCs) with interdigitated structures, which have been developed to facilitate the growth of modern microelectronic systems. Chemical vapor deposition has also been used to prepare graphene directly, but has limited scalability and often requires harsh synthetic conditions. Laser scribing was recently developed to prepare porous graphene networks from polyimide, but also suffers from several limitations. Consequently, the development of a facile and scalable method for the fabrication of graphene electrodes for high-performance SCs and MSCs remains an outstanding challenge.

SUMMARY OF THE INVENTION

In light of the foregoing, it is an object of the present invention to provide methods relating to the fabrication of graphene electrodes and related SCs and MSCs, and corresponding device structures, together with corresponding graphene ink compositions, thereby overcoming various deficiencies and shortcomings of the prior art, including those outlined above. It will be understood by those skilled in the art that one or more aspects of this invention can meet certain objectives, while one or more aspects can meet certain other objectives. Each objective may not apply equally, in all its respects, to every aspect of this invention. As such, the following objects can be viewed in the alternative, with respect to any one aspect of this invention.

It can also be an object of the present invention to provide a rapid, scalable methodology for preparation of highly-concentrated graphene media without impractical, time-inefficient, excessively-long sonication and/or centrifugation procedures.

It can be an object of the present invention to provide an economical, efficient approach to the preparation of pristine graphene solutions, dispersions and related graphene ink compositions, using low-cost organic solvents, such compositions at concentrations sufficient, and surface tension and viscosity tunable, for a range of end-use applications.

It can also be an object of the present invention, alone or in conjunction with one or more of the preceding objectives, to provide graphene electrodes and corresponding all solid-state SCs and MSCs, without resort to chemically-treated or vapor-deposited graphene of the prior art, and straightforward, scalable methods for their fabrication.

Other objects, features, benefits and advantages of the present invention will be apparent from the summary and the following descriptions of certain embodiments, and will be readily apparent to those skilled in the art having knowledge of various graphene preparation methods and graphene ink printing applications. Such objects, features, benefits and advantages will be apparent from the above as taken in conjunction with the accompanying examples, data, figures and all reasonable inferences to be drawn therefrom.

In part, the present invention can be directed to a method of fabricating a graphene capacitor. Such a method can comprise providing a graphene ink composition comprising graphene and an ethyl cellulose, such a composition not prepared from graphene oxide; depositing such an ink composition on a substrate; annealing such a graphene ink composition to decompose ethyl cellulose and provide an electrode component comprising graphene; and coupling electrolyte and metallic lead components to such an electrode component, to provide such a capacitor. Without limitation, as but one distinction over the prior art, such a capacitor can be absent a separate current collector component.

In certain embodiments, deposition can comprise inkjet printing such a graphene ink composition on such a substrate, to provide a microsupercapacitor. In certain other non-limiting embodiments, deposition can be selected from blade coating and spin coating such an ink composition on a substrate. Without limitation, two such capacitors can be in a sandwich configuration, with two electrode, two electrolyte and two lead components positioned between two corresponding substrates, to provide a supercapacitor. Regardless, deposition can be on a flexible polymeric substrate. As a separate consideration, such an electrolyte can be dried to provide an all solid-state capacitor.

Such a graphene ink composition can be prepared by a method as can compromise exfoliating graphene from a graphene source material with a medium comprising an organic solvent at least partially miscible in water, and a cellulosic polymer; contacting at least a portion of such an exfoliated graphene medium with an aqueous (e.g., without limitation, an aqueous NaCl solution) medium to concentrate exfoliated graphene and cellulosic polymer; isolating a solid graphene and cellulose composition; and contacting such a solid graphene-cellulose composition with an ink solvent component. In certain non-limiting embodiments, exfoliating a graphene source material can comprise or can be achieved by shear mixing such a material and such a medium. Regardless, a resulting graphene ink composition can be applied to, deposited and/or printed on a suitable substrate (e.g., without limitation, glass, metal, metal oxide, paper and flexible polymeric substrates) then annealed.

In certain non-limiting embodiments, such an organic solvent can be selected from suitable alcohols, esters, amides, ethers, and ketones and combinations thereof, such a solvent as can at least partially solubilize such a cellulosic dispersing agent. In certain such embodiments, such a solvent can comprise ethanol or acetone. Regardless of solvent identity, such a dispersing/stabilizing agent can comprise an ethyl cellulose.

Without limitation as to identity of an organic solvent and/or a cellulosic dispersing agent, an ink solvent component can be selected from various fluid components at least partially miscible with an aforementioned organic solvent component. Such ink solvent components can include, without limitation, chloroform, ~$C_6$-~$C8$ alkanes and alcohols, terpenes, terpene alcohols and combinations thereof, optionally together with compositions comprising one or more such components and one or more suitable co-dispersants. In certain embodiments, such a component can comprise a terpineol or, alternatively, a terpineol and cyclohexanone or ethanol, or ethanol, alone. Alternatively, such ink solvent components can include, without limitation, $C_2$-$C_8$ alkyl esters (e.g., without limitation, ethyl lactate and octyl acetate), alkylene glycols (e.g., ethylene glycol) and glycol ethers (e.g., di(ethylene glycol) methyl ether) and acetate esters thereof and ketones (e.g., acetone) and combinations thereof, optionally together with compositions comprising one or more suitable co-dispersants. Regardless, such solvent components are limited only by functional capacity to solubilize such a graphene/cellulosic polymer and afford a resulting fluid composition having a concentration, viscosity, surface tension and/or drying profile, whereby a corresponding ink composition can be tailored or tuned for a specific deposition technique or end-use application.

Regardless, an ink composition of this invention can comprise a graphene concentration of about 1 mg/mL to about 200 mg/mL, depending on deposition technique or end-use application. Without limitation as to any particular graphene concentration, such a composition can comprise dense, over-lapping, few layer, unagglomerated graphene flakes, such a morphology as can be evidenced by scanning electron and atomic force microscopy and characterized using techniques of the sort discussed herein. Regardless, in certain embodiments, such a composition can be printed or patterned on a substrate and annealed, providing such a printed composition a conductivity on the order of $10^4$ S/m.

Accordingly, the present invention can, in part, be directed to a composite comprising such a graphene ink composition deposited on or coupled to a substrate of the sort discussed above, illustrated herein or as would otherwise be known to those skilled in the art and made aware of this invention, including without limitation a flexible or foldable polymeric substrate component, such a graphene composition as can be inkjet printed, spin or spray coated or blade coated on such a substrate. Such a composition can be considered as comprising an annealation/decomposition product of cellulose-stabilized graphene. Regardless, with respect to such an ink composition, print morphology, electrical performance and mechanical properties can be substantially maintained over repeated substrate bending or folding.

Without limitation, the present invention can also be directed to a composite incorporated into a supercapacitor device. Such a supercapacitor device can comprise a capacitor comprising a substrate with an electrode component coupled thereto, such an electrode component as can comprise a graphene film absent graphene oxide; an electrolyte component coupled to such an electrode component and a metallic lead component coupled to such an electrode, such a capacitor as can be in a sandwich configuration with another such capacitor, with two electrode, two electrolyte and two lead components positioned between two corresponding substrates, to provide such a supercapacitor device. Without limitation, as but one distinction over the prior art, such a device can be absent a separate current collector component.

In certain embodiments, each such graphene electrode can, independently, have a thickness dimension between about 30-about 2,000 nanometers. In certain other embodiments, regardless of thickness dimension, such a graphene electrode can be coupled to a flexible polymeric substrate. In certain such non-limiting embodiments, such a substrate can comprise a polyimide. Without limitation as to electrode dimension or substrate identity, such an electrolyte can comprise poly(vinyl alcohol)-phosphoric acid. Any such electrolyte can be dried to provide an all solid-state supercapacitor. Regardless, without limitation and as illustrated below, a plurality of such supercapacitors can be arranged in a configuration selected from series and parallel configurations.

In part, the present invention can also be directed to a microsupercapacitor device. Such a device can comprise a substrate; an electrode pattern comprising n in-plane interdigitated graphene electrodes coupled to such a substrate, where n can be an integer greater than 1 and the number electrodes per polarity is one-half n, wherein graphene can be absent graphene oxide; and electrode and metallic lead components coupled to such a graphene pattern. Without limitation, as but one distinction over the prior art, such a microsupercapacitor can be absent a separate current collector component.

In certain embodiments, such an electrode pattern can comprise inkjet printed graphene. In other non-limiting embodiments, such graphene electrodes can be coupled to a flexible polymeric substrate. Without limitation, such a substrate can comprise a polyimide. Without limitation as to either substrate identity or electrode pattern, such an electrolyte can comprise poly(vinyl alcohol)-phosphoric acid. Any such electrolyte can be dried to provide an all solid-state microsupercapacitor. Regardless, a plurality of such microsupercapacitors can be arranged in a configuration selected from series and parallel configurations.

DETAILED DESCRIPTION OF THE DRAWINGS

The patent or application file contains at least one drawing executed in color. Copies of this patent or patent application publication with color drawing(s) will be provided by the office upon request and payment of the necessary fee.

FIG. 1. Schematic illustration of sandwich-structured SC fabrication. The digital image illustrates a complete SC device, in accordance with one non-limiting embodiment of this invention.

FIGS. 2A-I. Structural and chemical characterization of graphene films. (A-C) SEM images of graphene films on a polyimide substrate, including (A,B) top-view and (C) cross-sectional images. (D,E) TEM images of graphene flakes at different magnifications, along with (F) SAED pattern of graphene. (G-I) Large-area characterization of graphene films including Raman spectroscopy, XRD, and XPS, respectively.

FIGS. 3A-L. Cross-sectional SEM images of (A-B) G-2000, (C-D) G-100, (E-F) G-75, (G-H) G-50, (I-J) G-40, and (K-L) G-30 indicating the thickness of these samples to be ~2000 nm, ~100 nm, ~75 nm, ~50 nm, ~40 nm, and ~30 nm, respectively. 10 nm Au or 5 nm $OsO_4$ was deposited on the cross-sections of the G-X films to facilitate the thickness measurement.

FIGS. 4A-G. Electrochemical performance of sandwich-structured graphene supercapacitors. (A) Schematic diagram of a sandwich-structured supercapacitor, including the 3D structure and cross-section (not to scale). (B) CV curves for a device with 40 nm thick electrodes (SC-G-40) at different scan rates from 10 to 100 mV/s. (C) The linear relationship between the current density (extracted from CV curves at 0.5 V for both charge and discharge processes) and scan rates for SC-G-40. (D) Galvanostatic charge-discharge curves of SC-G-40 at different current densities ranging from 0.25 to 4.0 $A/cm^3$. (E) Volumetric capacitance of devices with different electrode thicknesses, measured at different current densities. (F) Cycling performance of SC-G-40 at a current density of 4.0 $A/cm^3$. (G) Ragone plot of SC-G-40 and the comparison with commercially available energy storage devices and recently reported materials. A: Li thin-film battery 4 V/500 mAh, B: Commercial SC 5.5 V/100 mF, C: Commercial AC-SC 2.75 V/44 mF, D: $Co_9S_8$/carbon cloth-$Co_3O_4$@$RuO_2$/carbon cloth (CSC-CRC), E: Hydrogen-treated $TiO_2$@$MnO_2$//hydrogen-treated $TiO_2$ carbon shell (H—$TiO_2$@$MnO_2$//H—$TiO_2$@C), F: Carbon nanofiber, G: Laser-scribed graphene (LSG), H: Methane ($CH_4$)-plasma treatment graphene oxide (MPG), I: Electrochemically reduced graphene oxide (ErGO), J: Hydrogenated single-crystal ZnO@amorphous ZnO-doped $MnO_2$ core-shell nanocables (HZM), K: Al electrolytic capacitor 3 V/300 mF.

Figure 5:
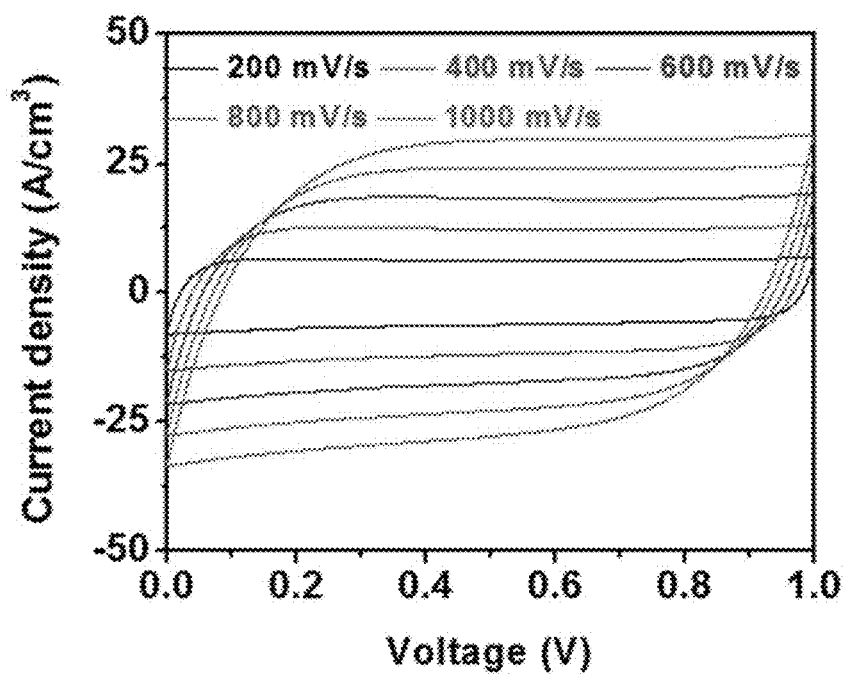

FIG. 5. CV curves of SC-G-40 at different scan rates from 200 to 1000 mV/s.

Figure 6A:
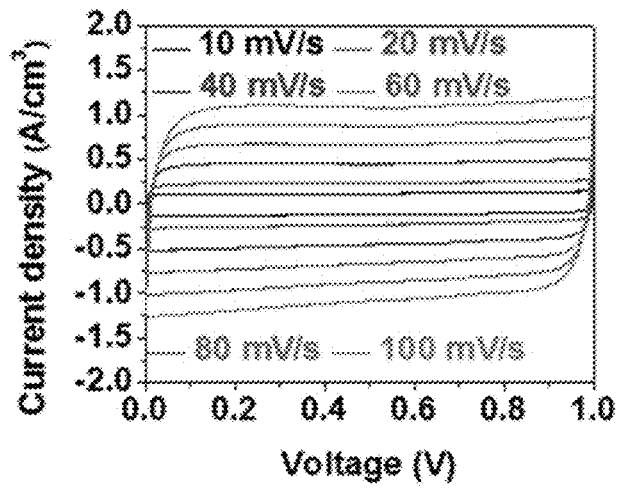
Figure 6B:
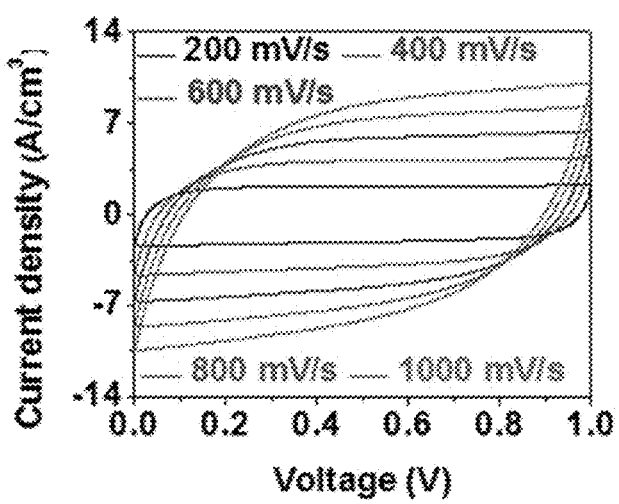
Figure 6C:
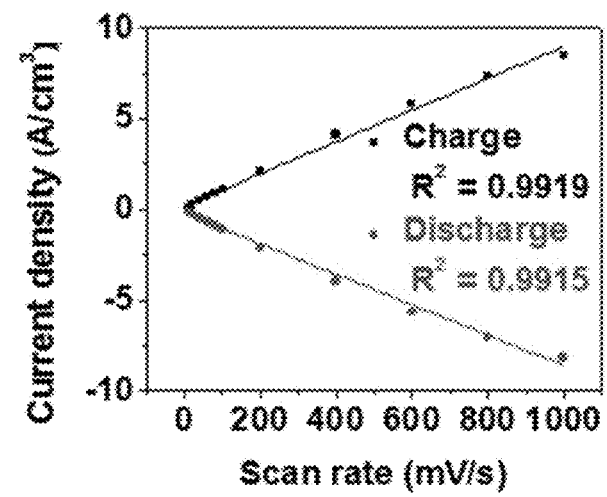
Figure 6D:
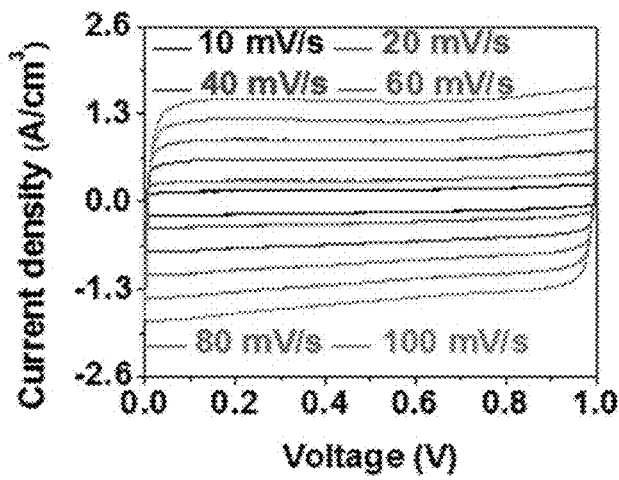
Figure 6E:
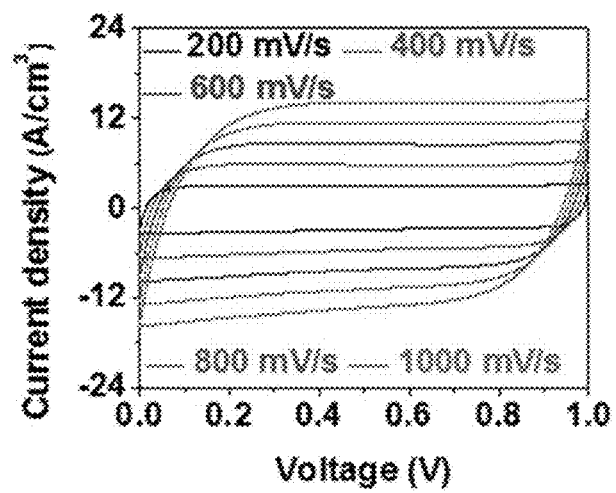
Figure 6F:
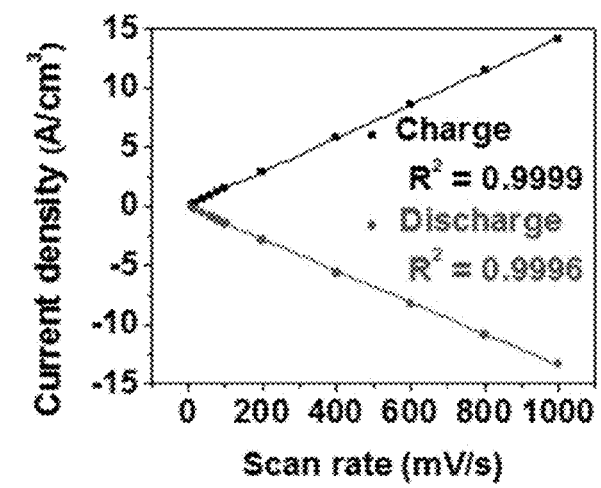
Figure 6G:
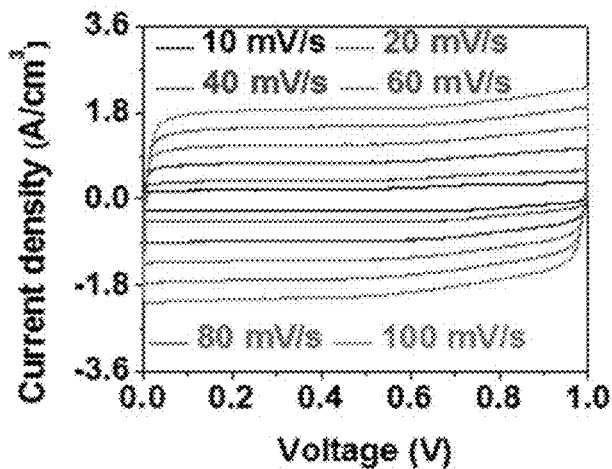
Figure 6H:
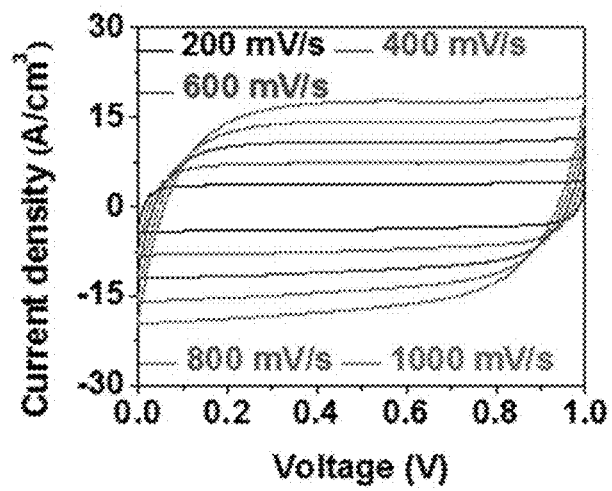
Figure 6I:
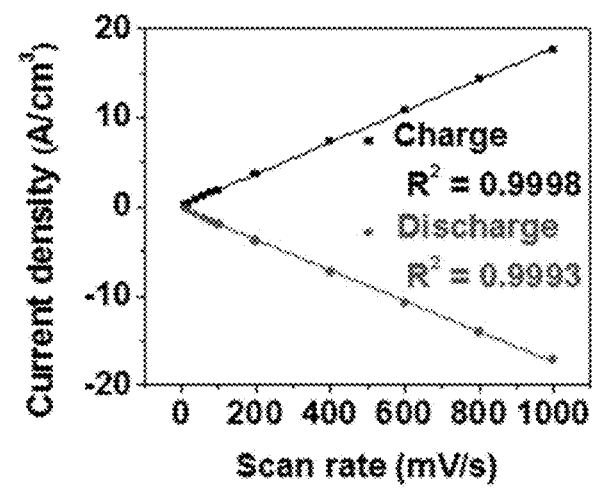
Figure 6J:
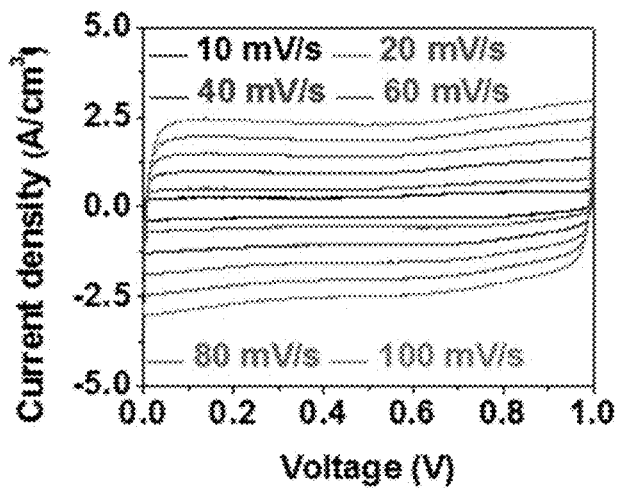
Figure 6K:
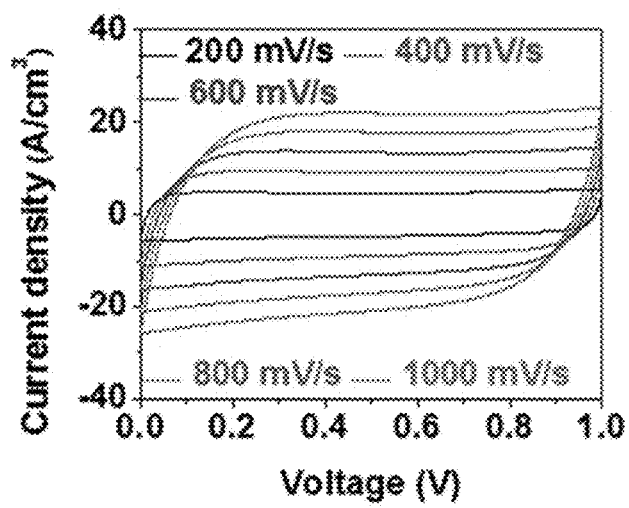
Figure 6L:
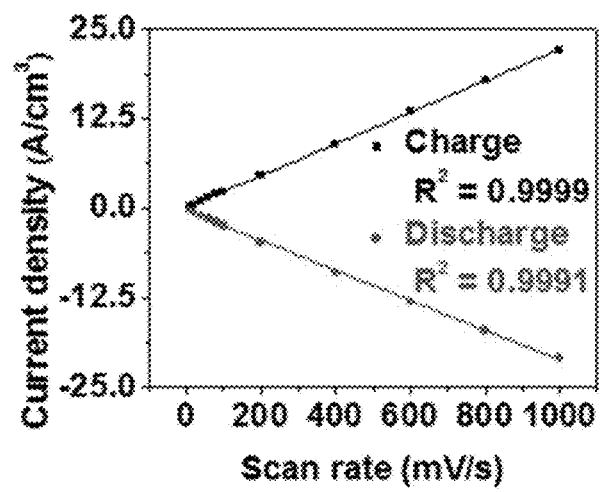
Figure 6M:
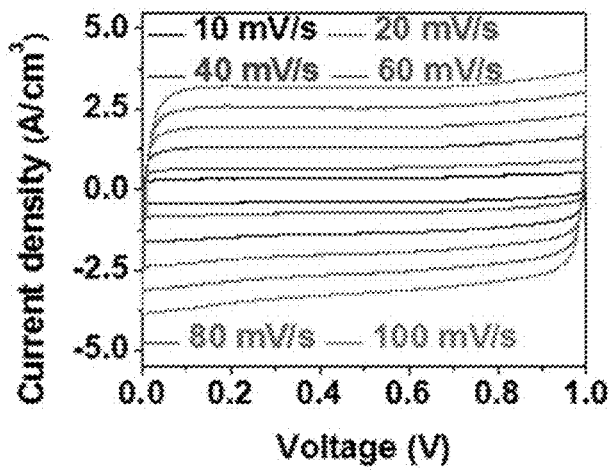
Figure 6N:
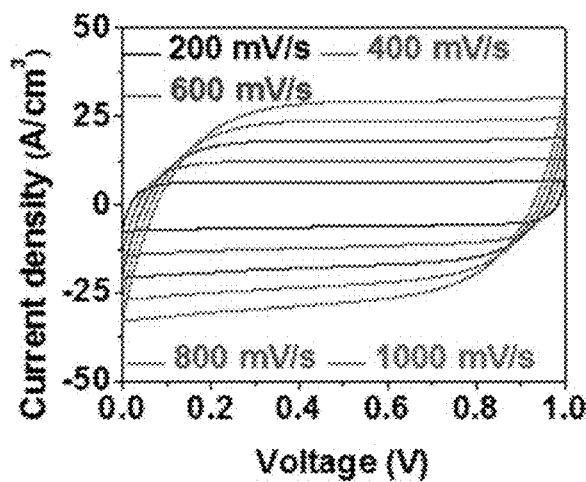
Figure 6O:
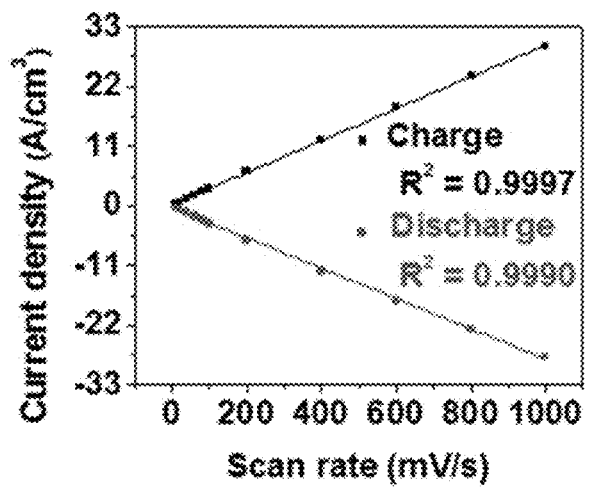
Figure 7A:
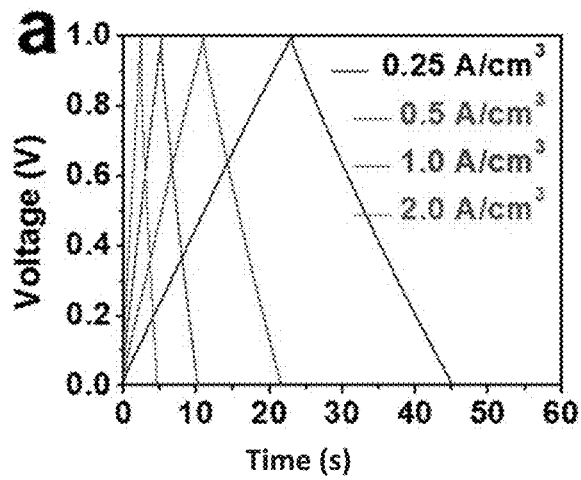
Figure 7B:
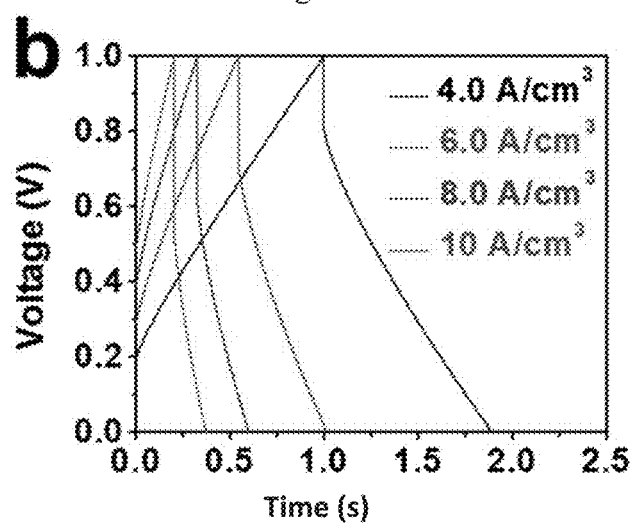
Figure 7C:
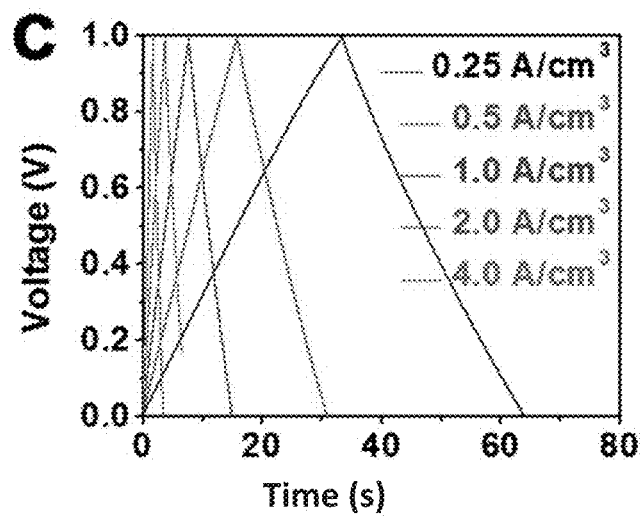
Figure 7D:
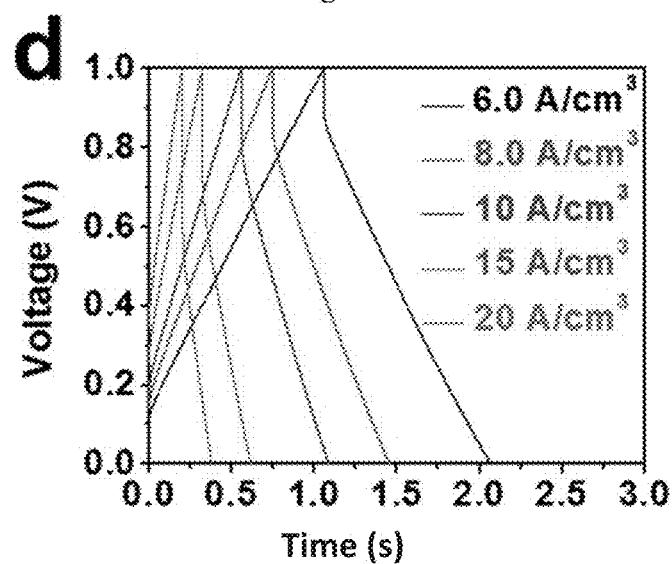
Figure 7E:
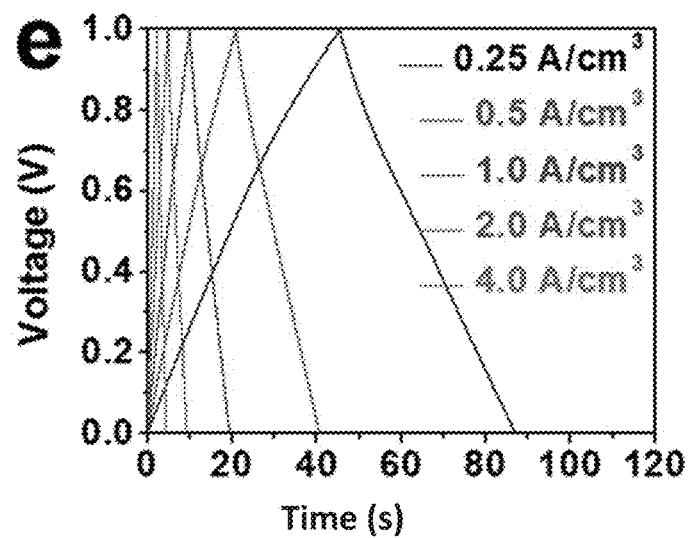
Figure 7F:
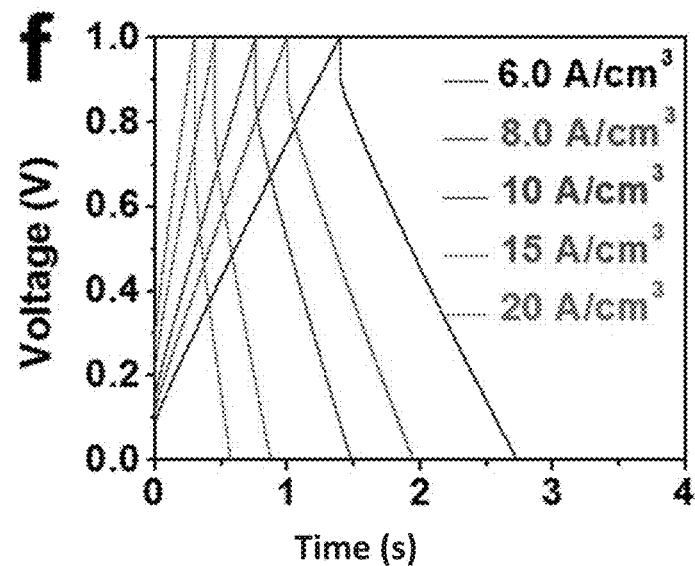
Figure 7G:
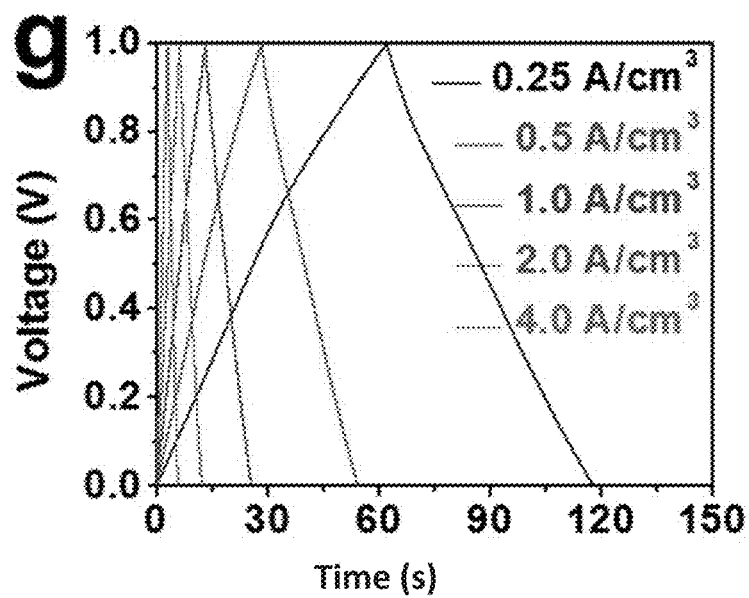
Figure 7H:
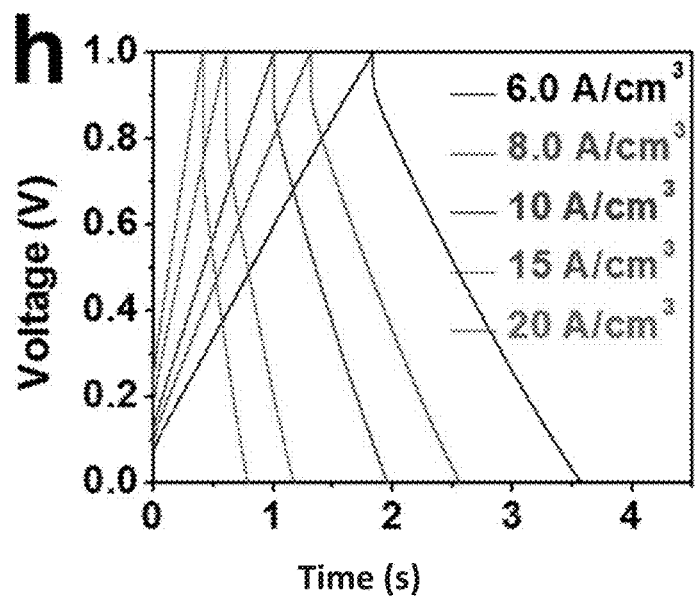
Figure 7I:
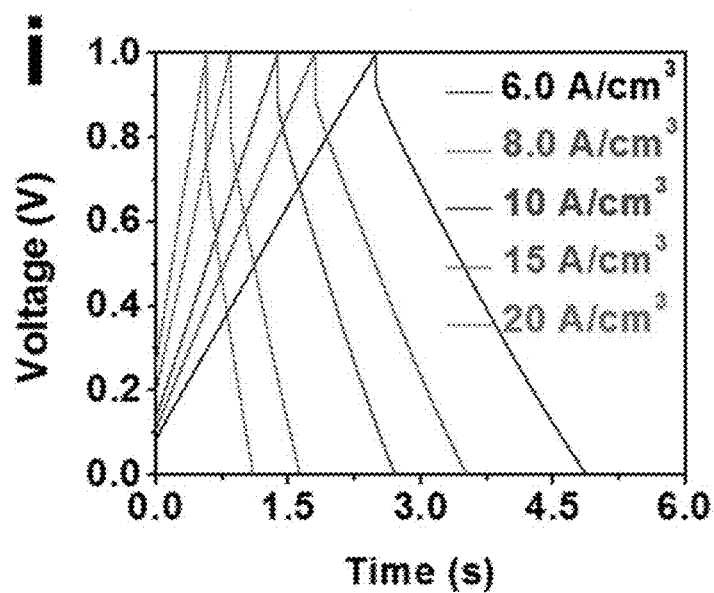
Figure 7J:
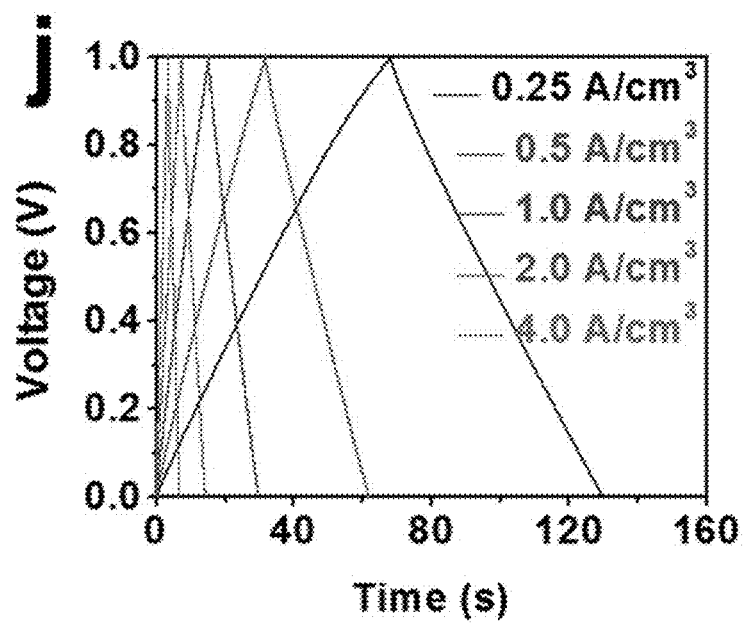
Figure 7K:
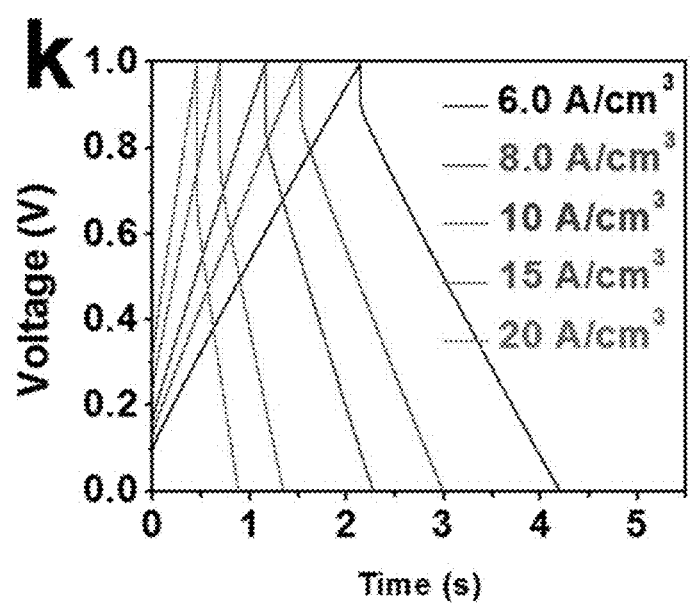

FIGS. 6A-O. (A,B) CV curves of SC-G-2000 at different scan rates from 10 to 1000 mV/s. (C) The linear relationship between the current density (extracted from CV curves at 0.5 V for charge and discharge processes, respectively) and scan rate for SC-G-2000. (D,E) CV curves of SC-G-100 at different scan rates from 10 to 1000 mV/s. (F) The linear relationship between the current density and scan rate for SC-G-100. (G,H) CV curves of SC-G-75 at different scan rates from 10 to 1000 mV/s. (I) The linear relationship between the current density and scan rate for SC-G-75. (J,K) CV curves of SC-G-40 at different scan rates from 10 to 1000 mV/s. (L) The linear relationship between the current density and scan rate for SC-G-40. (M,N) CV curves of SC-G-30 at different scan rates from 10 to 1000 mV/s. (O) The linear relationship between the current density and scan rate for SC-G-30. All of these devices show high $R^2$ value in the charge-discharge processes, demonstrating desirable capacitive behavior.

FIGS. 7A-K. Galvanostatic charge-discharge curves of (A,B) SC-G-2000, (C,D) SC-G-100, (E,F) SC-G-75, (G,H) SC-G-50, (I) SC-G-40, and (J,K) SC-G-30 at different current densities from 0.25 to 20 $A/cm^3$.

Figure 8A:
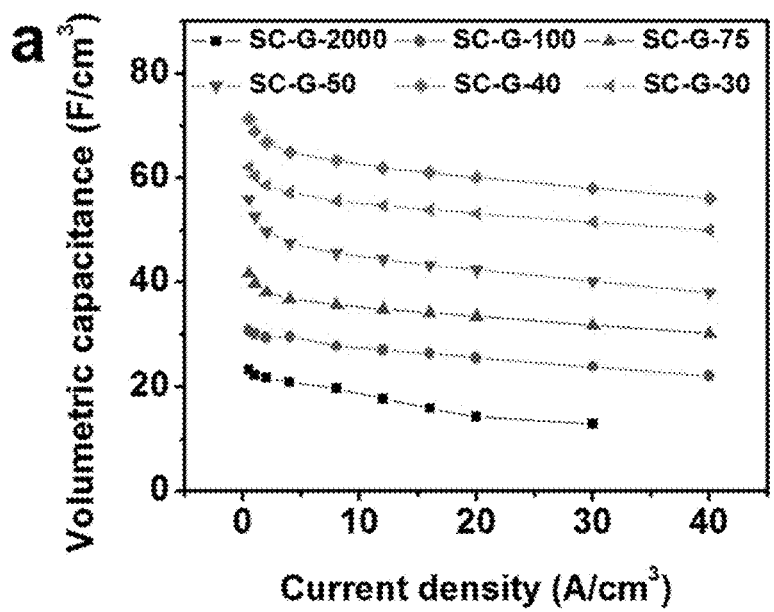
Figure 8B:
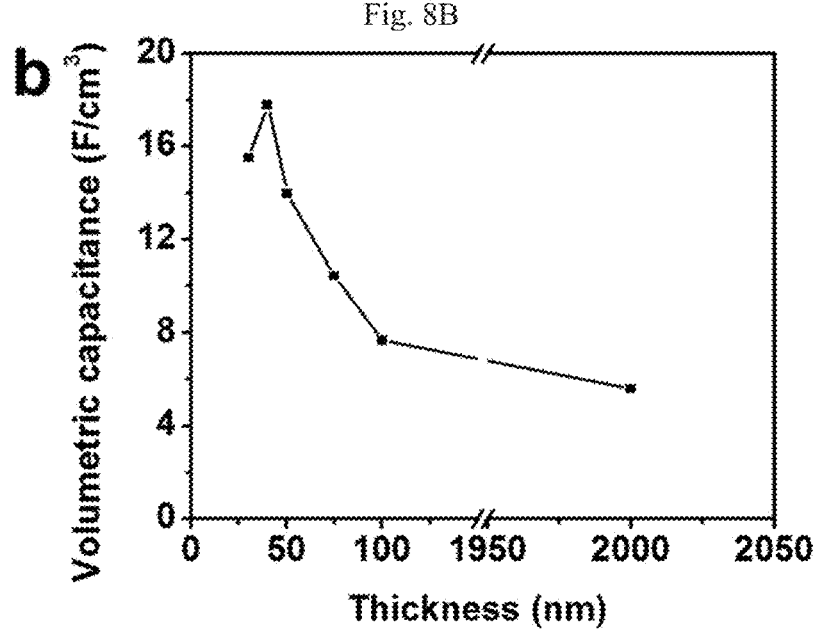
Figure 9A:
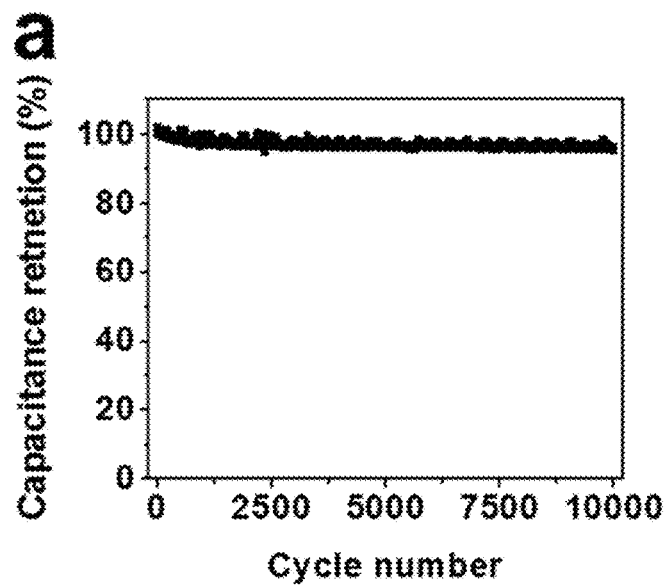
Figure 9B:
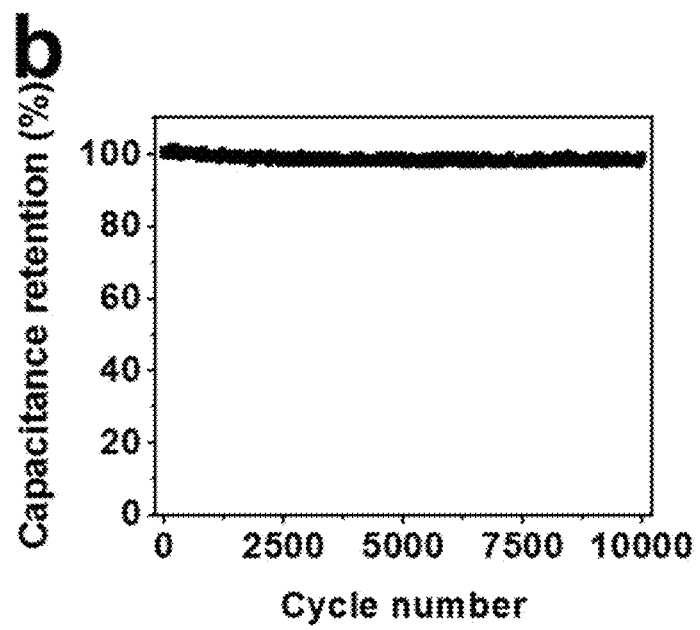
Figure 9C:
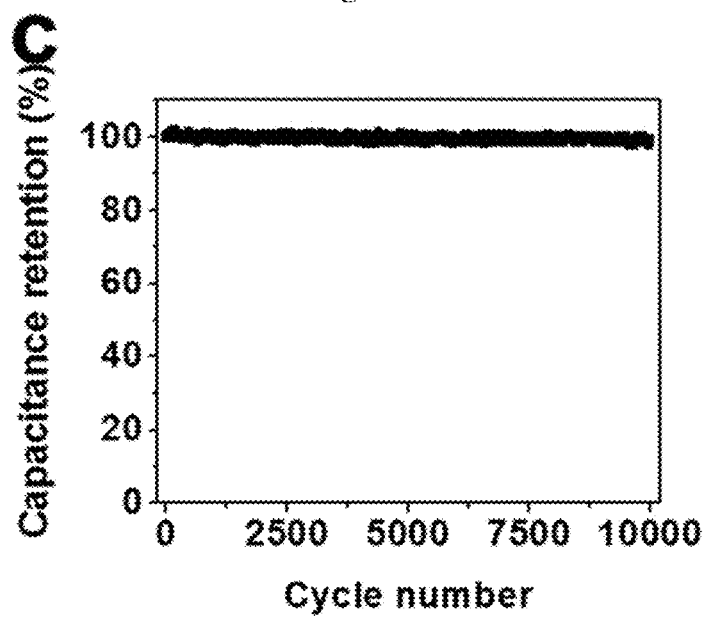
Figure 9D:
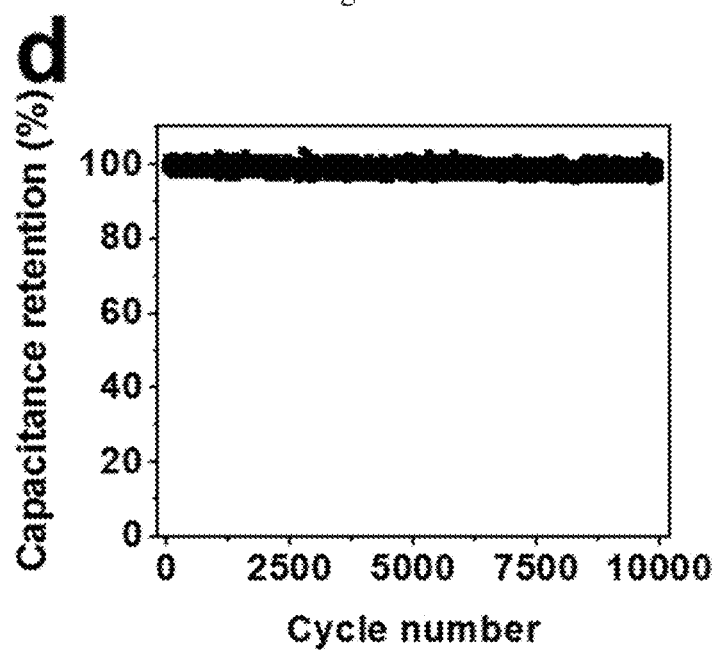
Figure 9E:
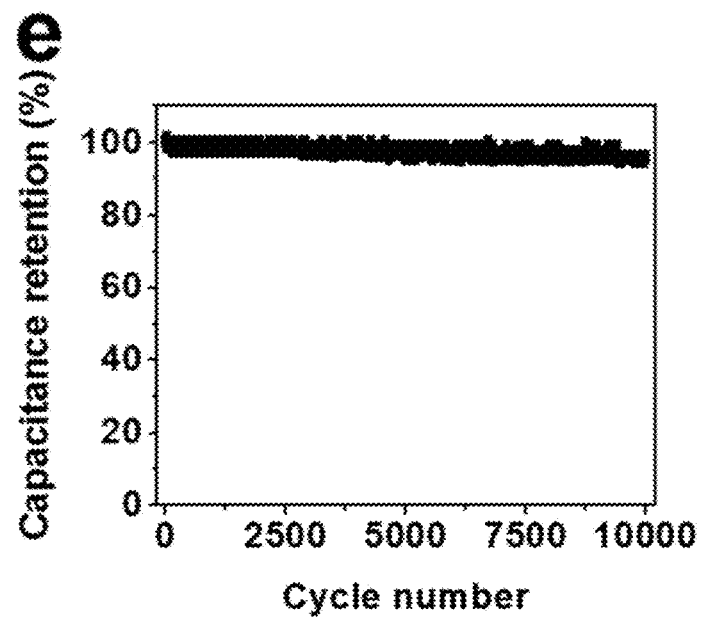

FIGS. 8A-B. (A) Volumetric capacitance of electrodes in SC-G-X at different current densities. (B) Volumetric capacitance of SC-G-X devices with different thickness of the electrode films.

FIGS. 9A-E. Cycling performance of (A) SC-G-2000, (B) SC-G-100, (C) SC-G-75, (D) SC-G-50, and (E) SC-G-30 at a current density of 4.0 $A/cm^3$.

Figure 10:
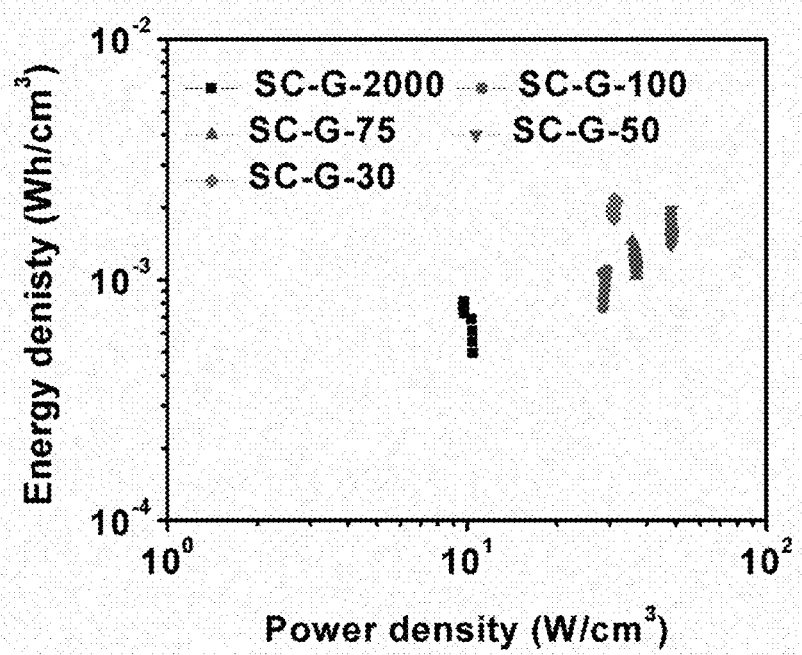

FIG. 10. Ragone plots of SC-G-2000, SC-G-100, SC-G-75, SC-G-50, and SC-G-30.

Figure 11:
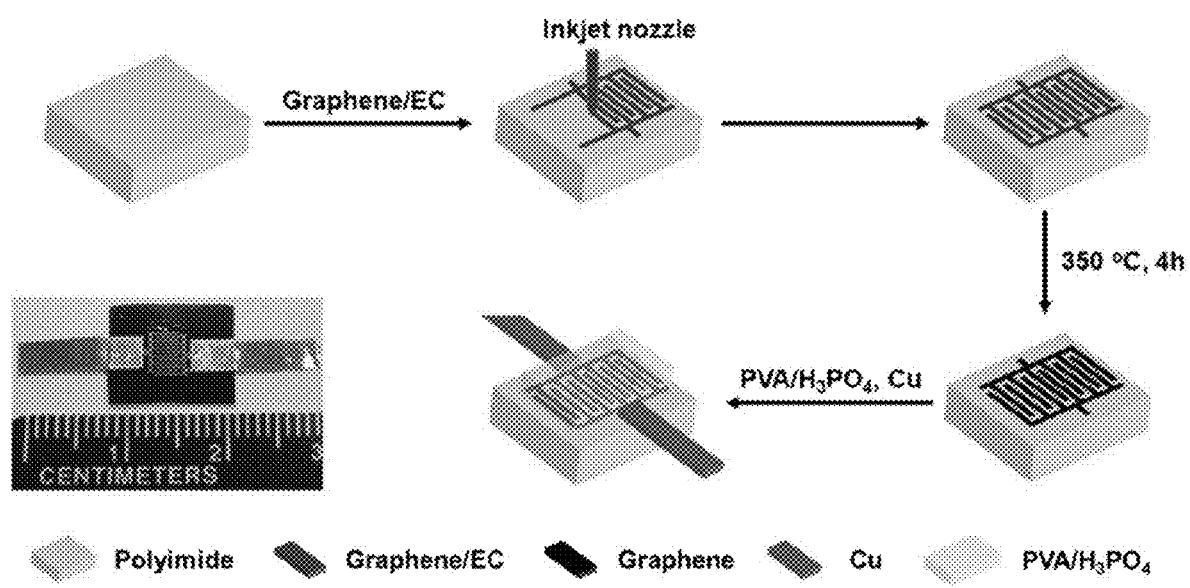

FIG. 11. Schematic illustration of interdigitated MSC fabrication. The digital image illustrates a complete MSC device, in accordance with one non-limiting embodiment of this invention.

Figure 12:
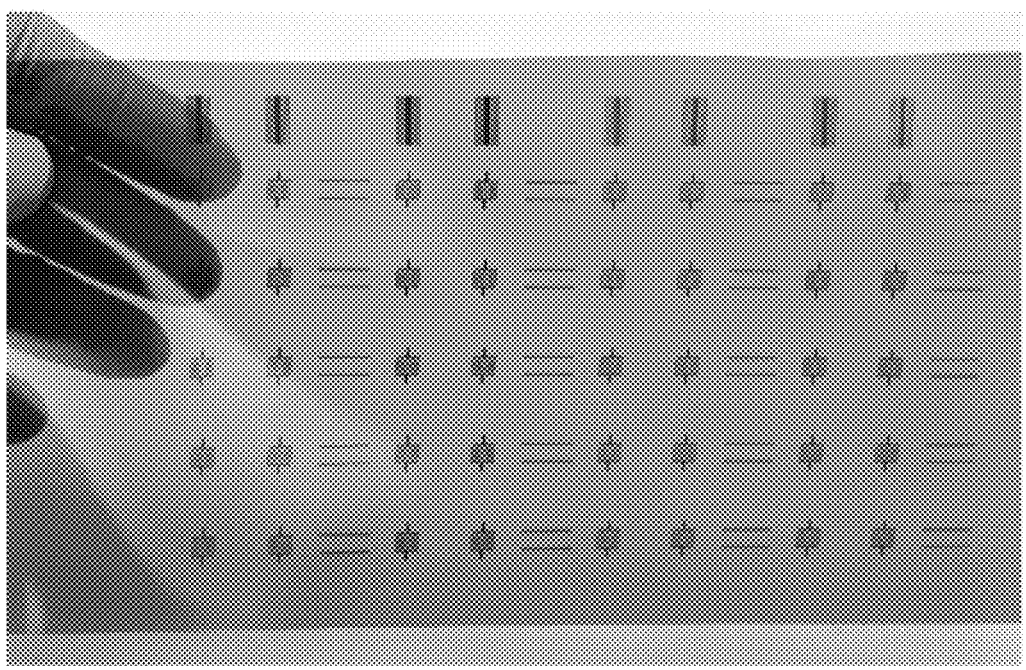

FIG. 12. Digital image of inkjet-printed G/EC patterns.

FIGS. 13A-G. Electrochemical performance of inkjet-printed graphene microsupercapacitors. (A) Schematic diagram of a microsupercapacitor with interdigitated structure, including both a 3D representation and 2D cross-section (not to scale). (B) CV curves of MSC-G at different scan rates from 10 to 100 mV/s. (C) The linear relationship between the current density (extracted from CV curves at 0.5 V for both charge and discharge processes) and scan rates for MSC-G. (D) Galvanostatic charge-discharge curves of MSC-G at different current densities ranging from 0.25 to 4.0 $A/cm^3$. (E) Volumetric capacitance of MSC-G at different current densities. (F) Cycling performance of MSC-G at a current density of 4.0 $A/cm^3$. (G) Ragone plot of MSC-G and recent literature reports. L: Carbon fiber tows (CFTs), M: Boron-doped laser-induced graphene (B-LIG), N: Laser-induced graphene (LIG), O: Laser-scribed graphene (LSG).

Figure 14A:
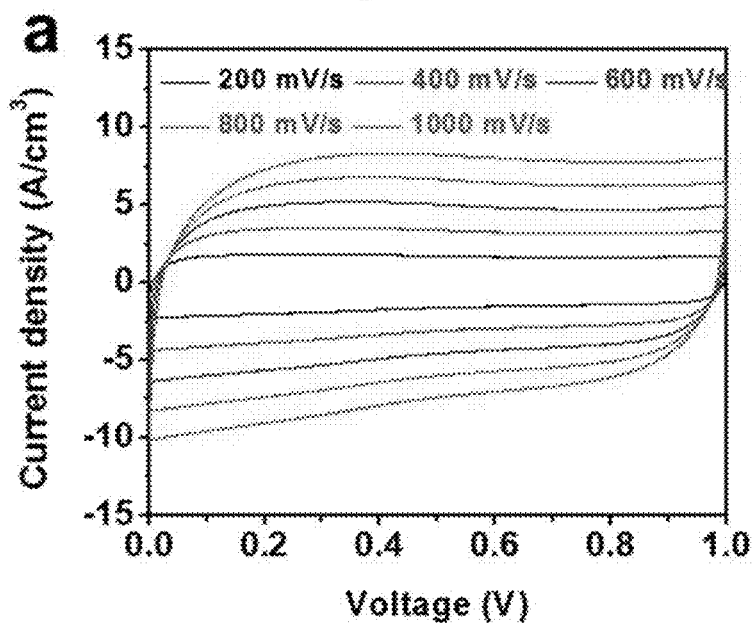
Figure 14B:
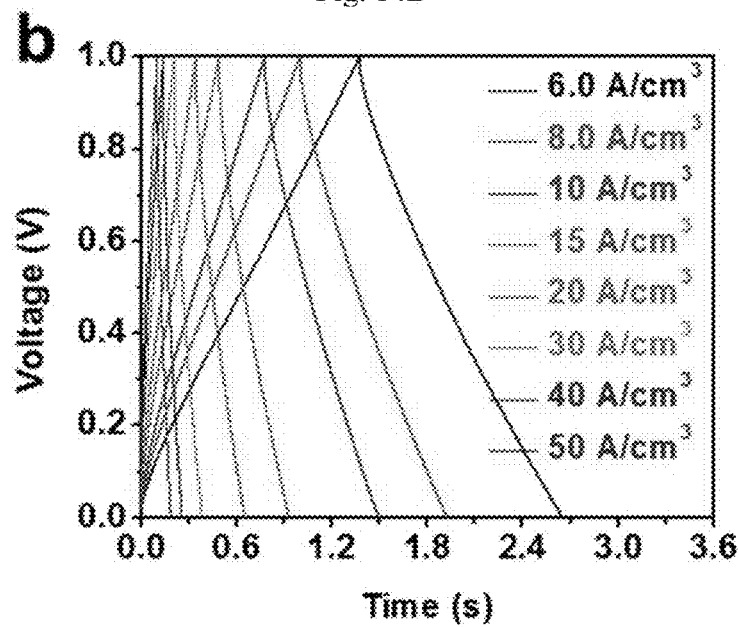

FIGS. 14A-B. (A) CV curves of MSC-G at different scan rates from 200 to 1000 mV/s. (B) Galvanostatic charge-discharge curves of MSC-G at different current densities from 6.0 to 50 $A/cm^3$.

Figure 15A:
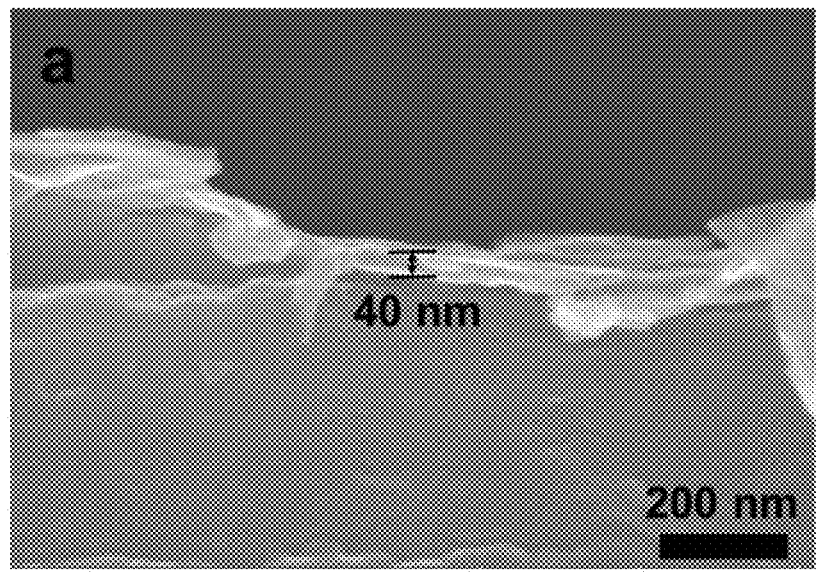
Figure 15B:
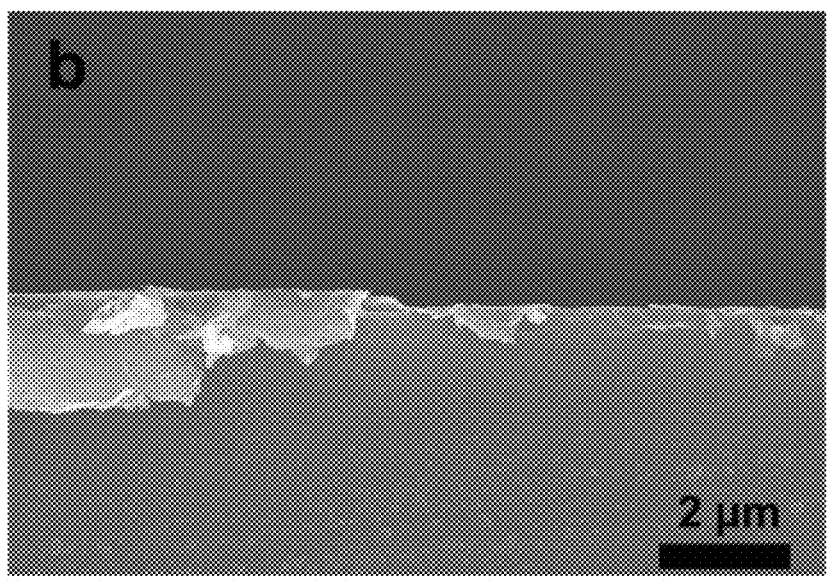

FIGS. 15A-B. Cross-sectional SEM images of a graphene electrode in MSC-G with a thickness of ~40 nm. The volume of the device was calculated using the graphene pattern area and the electrode thickness, including the space between the electrodes. 5 nm $OsO_4$ was deposited on the cross-section of the graphene film in order to facilitate the thickness measurement.

FIGS. 16A-H. Flexibility and impact testing, as well as assembly of multiple devices in parallel and series configurations for SC-G-40 and MSC-G. (A) Capacitance retention of SC-G-40 and MSC-G under different bending strains at a current density of 1.0 $A/cm^3$. (B) Capacitance retention of SC-G-40 and MSC-G at different bending cycles to a radius of curvature of 2.5 mm. (C) Capacitance retention of SC-G-40 following repeated impact testing. (D) Schematic circuit diagram of three single devices connected in series and parallel configurations. (E,F) Galvanostatic charge-discharge curves of three SC-G-40 and MSC-G devices, respectively, connected in series at a current density of 1.0 $mA/cm^2$, and comparison with a single device. (G,H) Galvanostatic charge-discharge curves of three SC-G-40 and MSC-G devices, respectively, connected in parallel at a current density of 1.0 $mA/cm^2$, and comparison with a single device.

Figure 17:
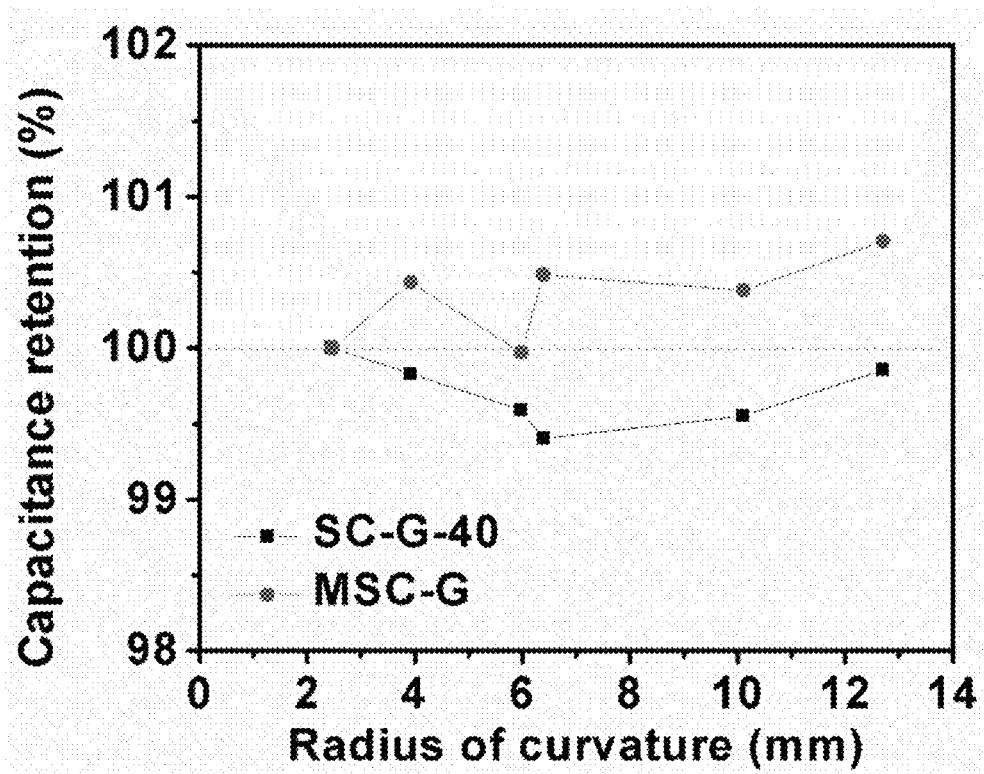

FIG. 17. Capacitance retention of SC-G-40 and MSC-G at different bending states.

DETAILED DESCRIPTION OF CERTAIN EMBODIMENTS

Recent reports have demonstrated liquid-phase exfoliation of graphite for the production of stable graphene dispersions using the polymer ethyl cellulose in common, low-cost solvents such as ethanol and terpineol. The graphene/ethyl cellulose (G/EC) system is suitable for applications in scalable flexible electronics, with demonstrated processing ease and compatibility with a range of desirable substrates, as well as excellent electrical conductivity and mechanical flexibility. Moreover, this system can be tailored for a range of additive manufacturing technologies including inkjet, gravure, and screen printing. The present invention extends this promising processing platform to electrochemical energy storage applications, realizing high-performance solid-state SCs. The suitability of the G/EC material for all-solid-state SC applications is first evaluated using blade-coated and spin-coated thin-film electrodes in sandwich-structured devices. In this configuration, the high-conductivity, binder-free electrode mitigates the need for a separate current collector, simplifying the device fabrication process and eliminating potentially weak interfaces. The established compatibility of G/EC with drop-on-demand inkjet printing is then leveraged to fabricate MSCs, demonstrating the versatile utility of printed graphene electrodes for robust, high-performance energy storage applications.

Sandwich-structured SCs were prepared with graphene electrodes as illustrated in FIG. 1. G/EC is first prepared by liquid-phase exfoliation of graphite in ethanol as described previously. Briefly, graphite was exfoliated by high shear mixing to produce few-layer graphene flakes with a typical thickness of ~2 nm, which were stabilized at high concentration by the polymer EC. Centrifugation and selective flocculation steps were performed to remove remaining graphite flakes and excess EC, yielding a powder of G/EC. In this manner, the ink formulation for coating or printing is largely decoupled from the original exfoliation, providing a versatile platform to tune ink properties. The resulting G/EC powder was dispersed in a mixture of ethanol and terpineol to form an ink that was cast into thin films by spin coating or blade coating onto flexible polyimide substrates, followed by thermal annealing to decompose the EC in the film. The thickness of the graphene film was controlled by adjusting the spin rate or ink concentration, and is designated as G-X (where X represents the thickness of the film in nanometers). The gel electrolyte of poly(vinyl alcohol)-phosphoric acid (PVA-$H_3PO_4$) was subsequently deposited on the film surface. After solidification of the electrolyte, two identical electrodes were sandwiched to form the device, identified as SC-G-X, as shown in the digital image in FIG. 1. Details for G/EC synthesis and device fabrication can be found in the following examples.

Figure 2A:
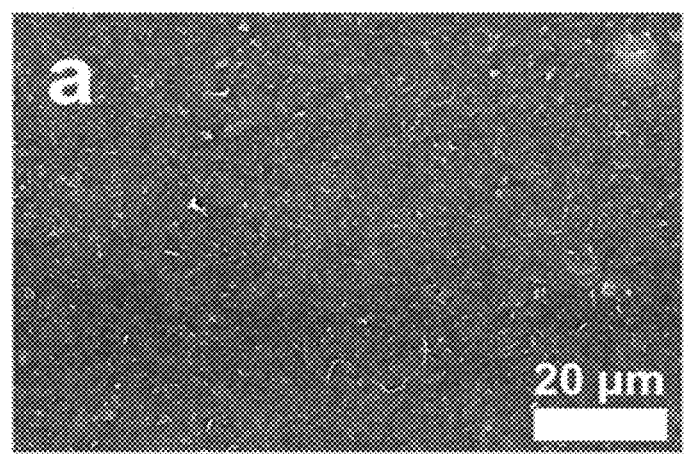
Figure 2B:
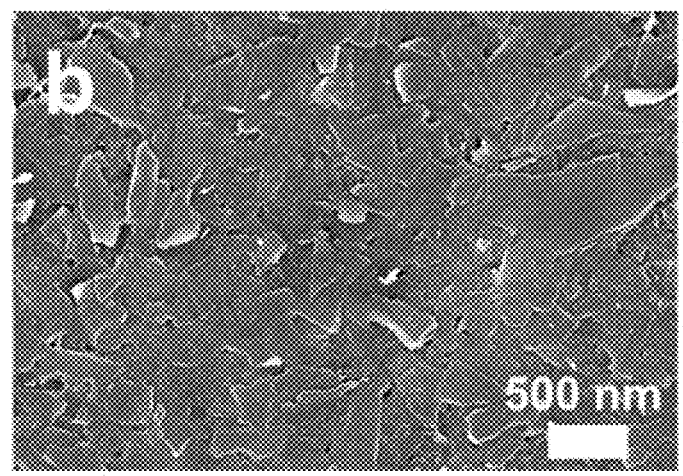
Figure 2C:
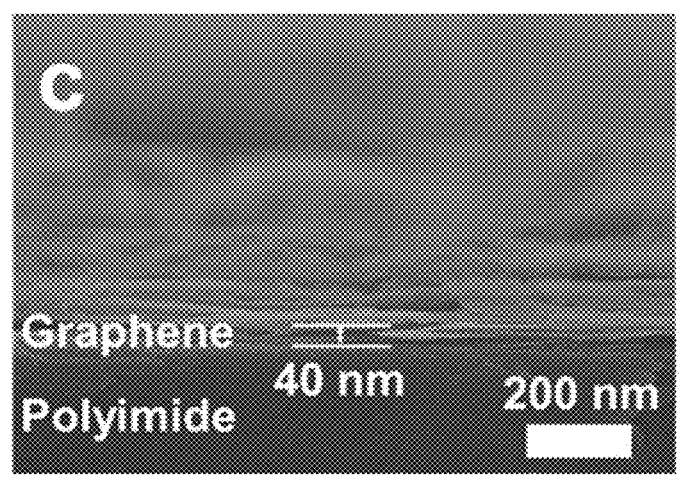
Figure 2D:
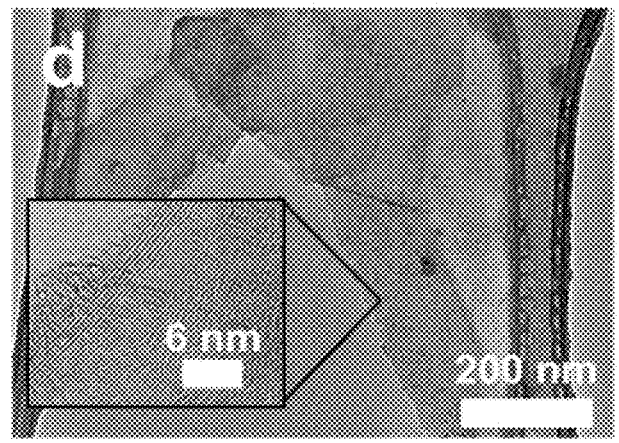
Figure 2E:
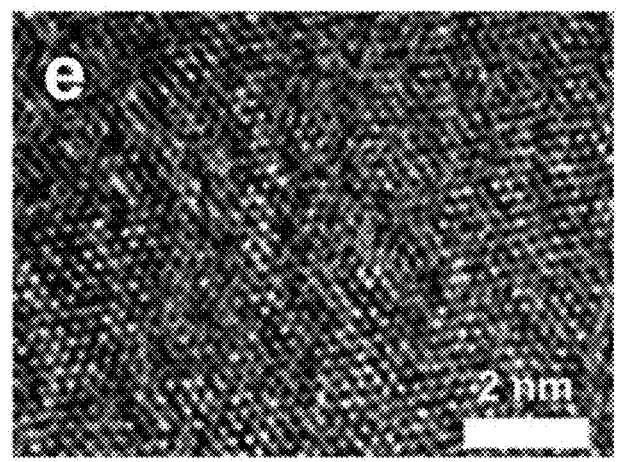
Figure 2F:
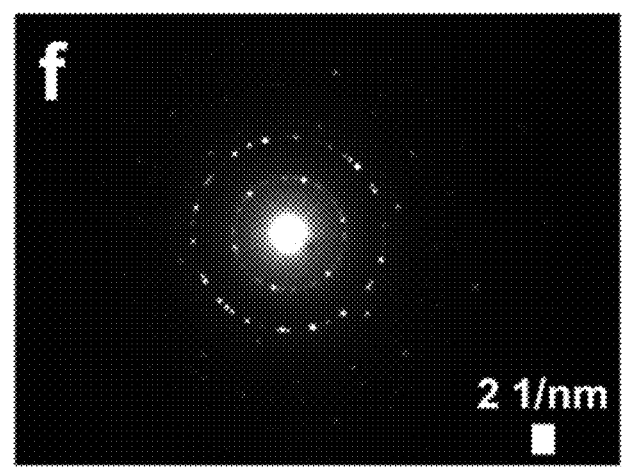
Figure 2G:
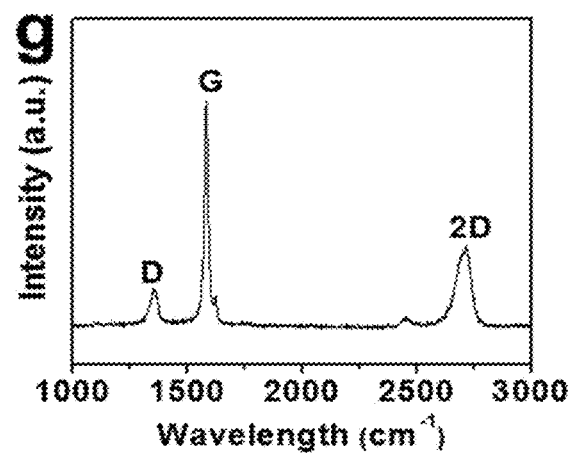
Figure 2H:
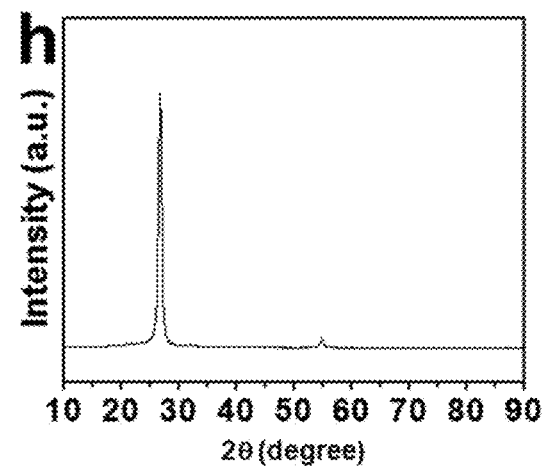
Figure 2I:
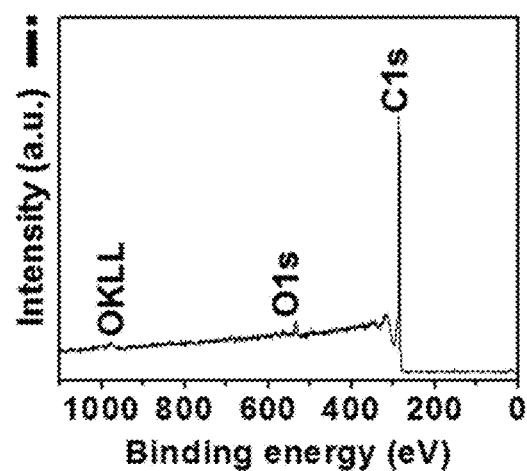
Figure 3A:
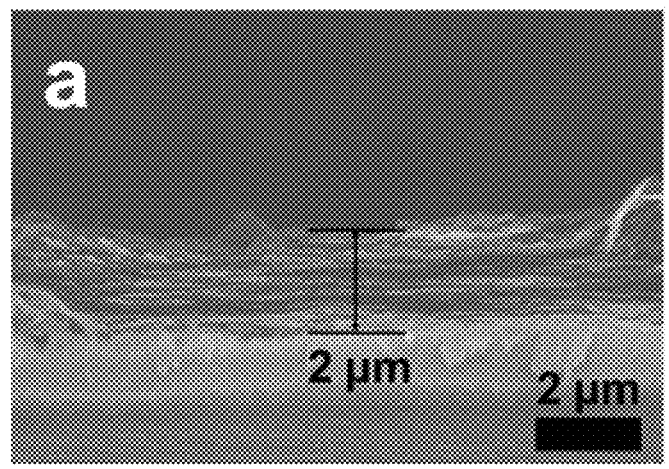
Figure 3B:
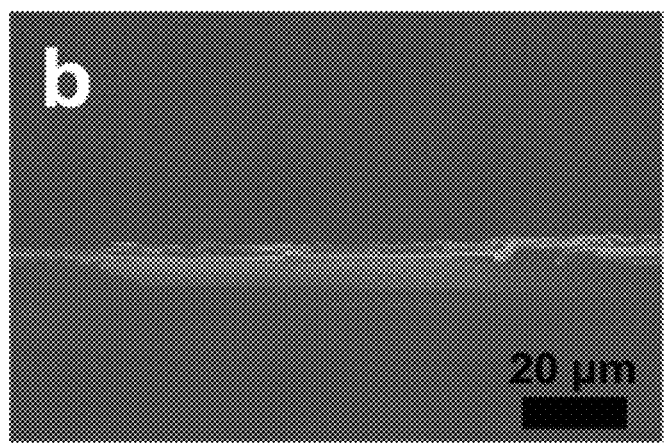
Figure 3C:
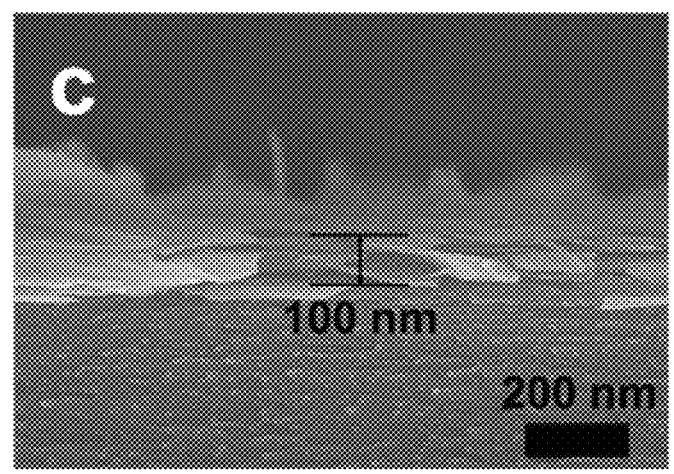
Figure 3D:
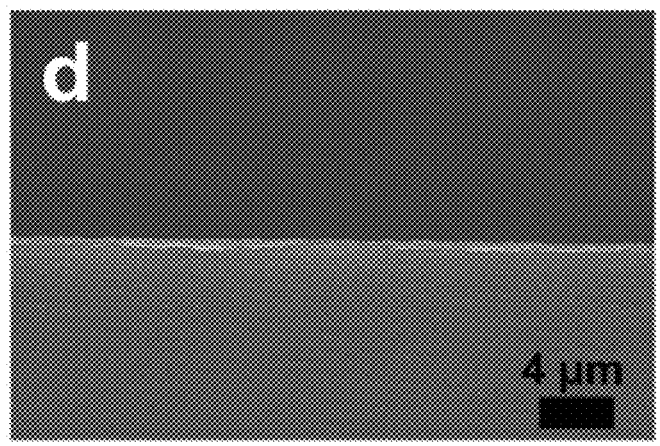
Figure 3E:
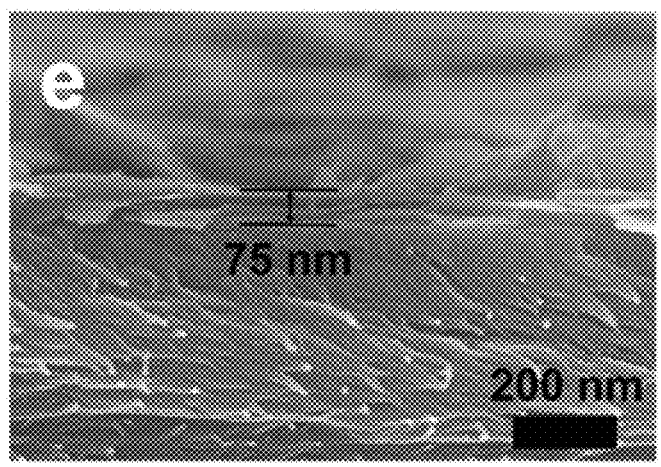
Figure 3F:
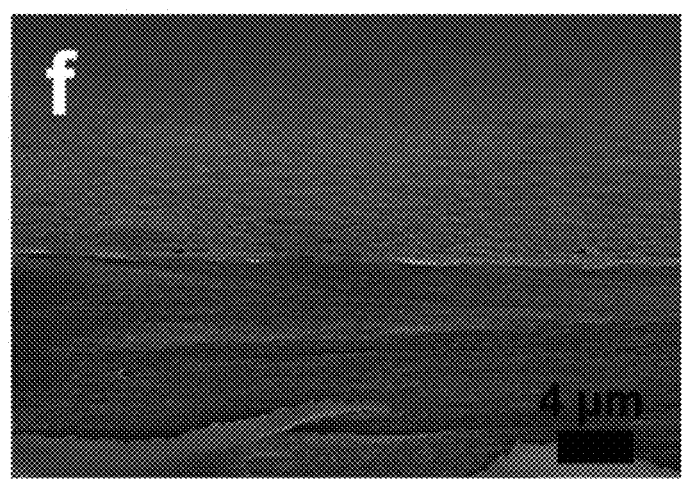
Figure 3G:
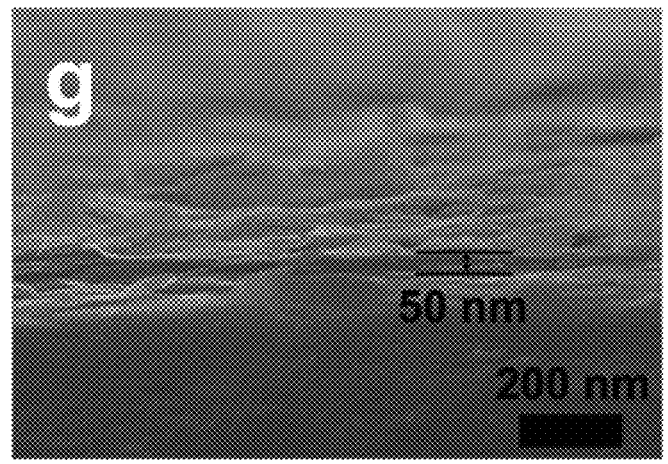
Figure 3H:
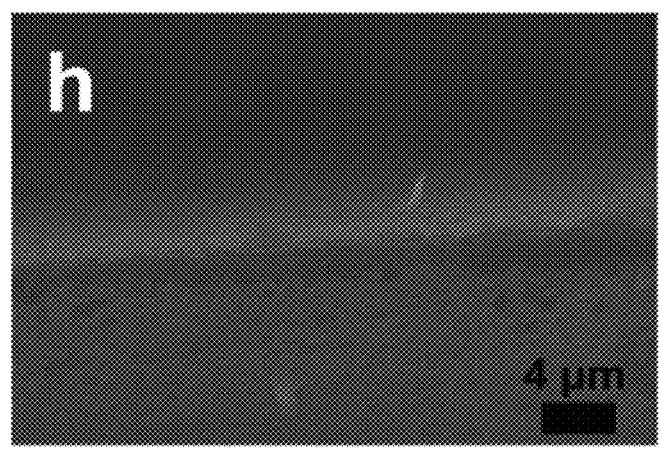
Figure 3I:
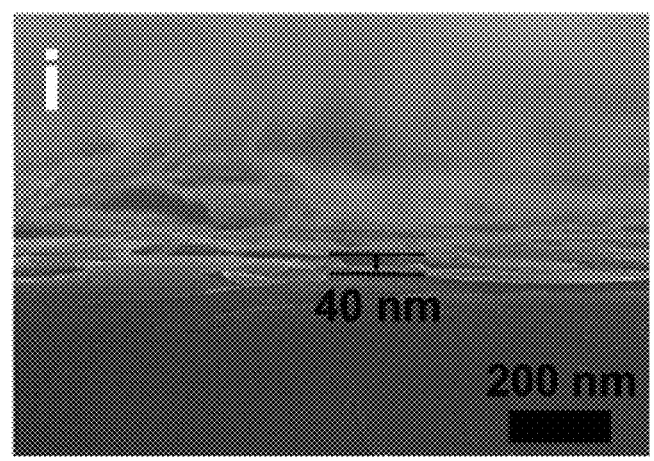
Figure 3J:
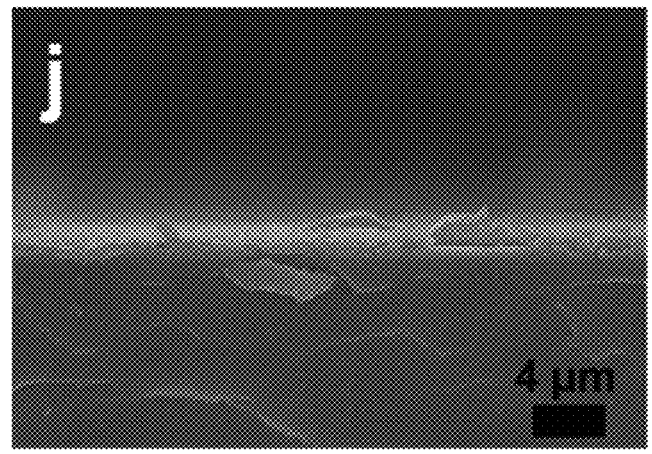
Figure 3K:
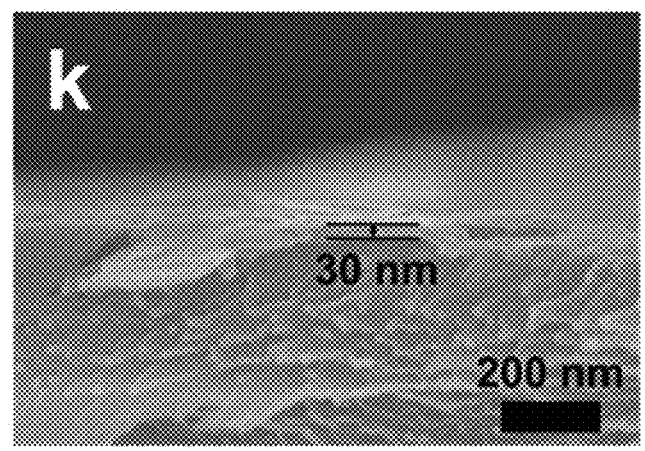
Figure 3L:
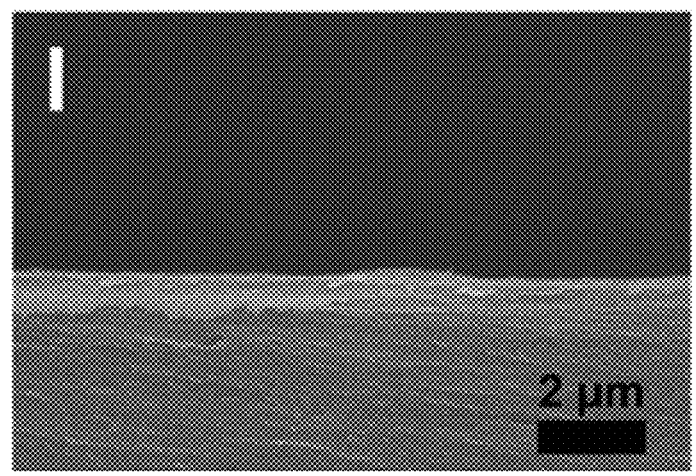

The morphology of the graphene films was studied by scanning electron microscopy (SEM) and transmission electron microscopy (TEM). FIG. 2A,B show top-view SEM images of graphene films at different magnifications, in which the graphene flakes are uniformly packed. In addition, FIG. 2C and FIG. 3 show cross-sectional SEM images of coated graphene films. The average thickness of these films depends on the processing parameters, and ranges from 30 to 2000 nm. Devices assembled using these films are referred to as SC-G-30, SC-G-40, SC-G-50, SC-G-75, SC-G-100, and SC-G-2000, corresponding to the different thicknesses (in nanometers). The morphologies of individual graphene flakes were further characterized by TEM, as shown in FIG. 2D-F. FIG. 2D shows several graphene flakes, with a lateral size of several hundreds of nanometers. A thickness of 7 graphene layers is observed at the flake edge as shown in the inset of FIG. 2D. A high-resolution image is shown in FIG. 2E, illustrating the crystalline structure and lattice fringes characteristic of graphene. The selected area electron diffraction (SAED) pattern, shown in FIG. 2F, indicates polycrystalline features due to the stacking of multiple graphene flakes. Furthermore, large-area characterization of the graphene films including Raman spectroscopy (FIG. 2G), X-ray diffraction (XRD) (FIG. 2H), and X-ray photoelectron spectroscopy (XPS) (FIG. 2I), indicate the high quality of the material. The low Raman D-to-G peak ratio suggests a low density of defects, while the sharp XRD peak is correlated with the crystallinity of the few-layer graphene. The XPS spectrum further indicates a low oxygen content of the film, resulting from the use of pristine rather than oxidized graphene.

Figure 4A:
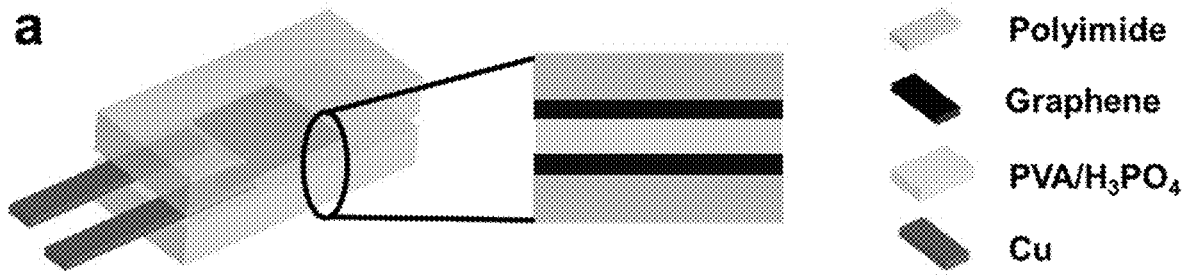
Figure 4B:
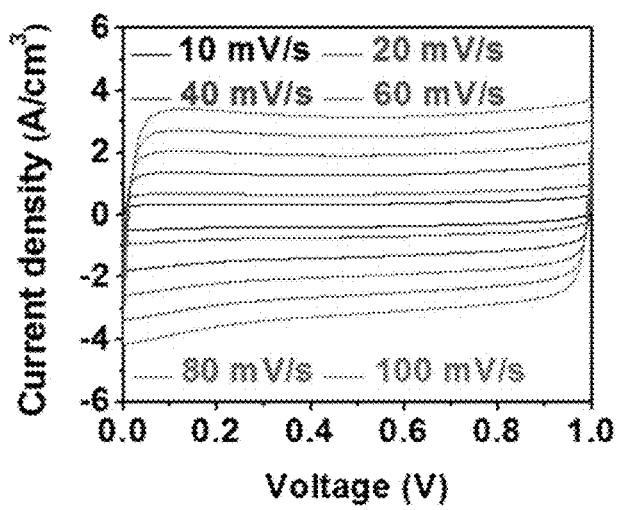
Figure 4C:
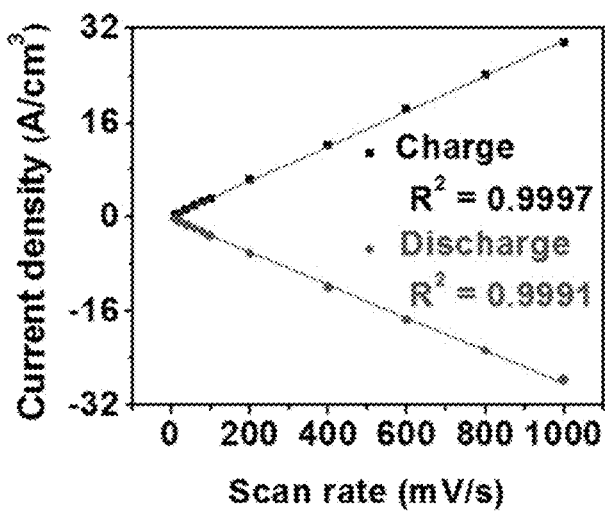
Figure 4D:
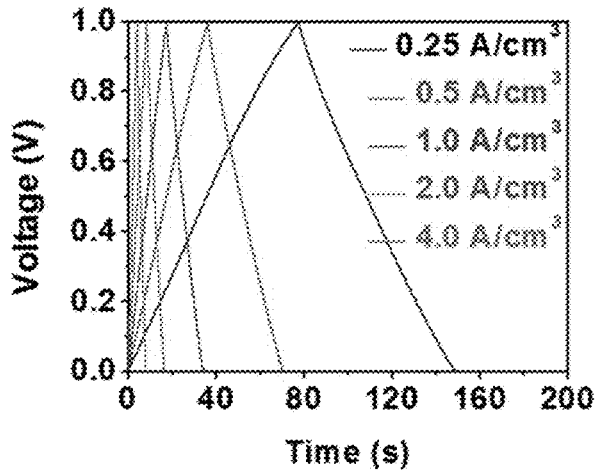

The electrochemical performance of sandwich-structured graphene supercapacitors (FIG. 4A) was first studied by cyclic voltammetry (CV) and galvanostatic charge-discharge experiments in a potential window from 0.0 to 1.0 V. FIG. 4B and FIG. 5 show the CV curves of SC-G-40 at different scan rates from 10 to 1000 mV/s. The CV curves exhibit a highly rectangular shape at low scan rate, which was well-maintained even at a high scan rate of 100 mV/s. The CV shape is distorted only at exceptionally high scan rates due to internal resistance, especially at a scan rate of 1000 mV/s. The capacitive current increased with an increasing scan rate, with a strong linear correlation observed with $R^2$=0.9997 and 0.9991 for the charge and discharge processes, respectively (FIG. 4C). The results demonstrate the desirable capacitive behavior of SC-G-40. Similar performance characteristics were observed in other SC-G-X devices, as shown in FIG. 6. FIG. 4D and FIG. 7 show the galvanostatic charge-discharge curves of these devices with varying current densities. The nearly symmetric charge and discharge curves confirm the desirable capacitive behavior of these devices, consistent with the CV results.

Figure 4E:
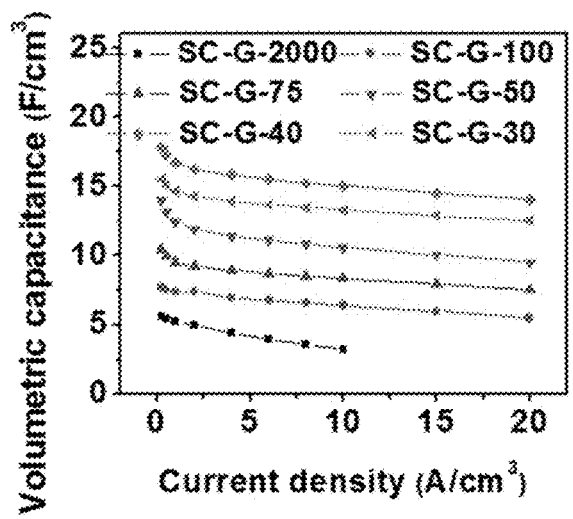

The volumetric capacitance of these devices and their electrodes are calculated from the galvanostatic charge-discharge curves, and plotted in FIG. 4E and FIG. 8A, respectively. By these metrics, SC-G-40 yielded the best performance among this set of devices. Specifically, the volumetric capacitance reaches 17.8 $F/cm^3$ at a current density of 0.25 $A/cm^3$ for the full device and 71.2 $F/cm^3$ at a current density of 0.5 $A/cm^3$ for each individual electrode. With increasing current density, the device capacitance gradually decreases to 14.0 $F/cm^3$ at a current density of 20 $A/cm^3$. This behavior represents excellent rate performance, with a capacitance retention of 79% as the current density increases by a factor of 80 from 0.25 to 20 $A/cm^3$. Other devices show a similar trend with varying current densities.

Figure 4F:
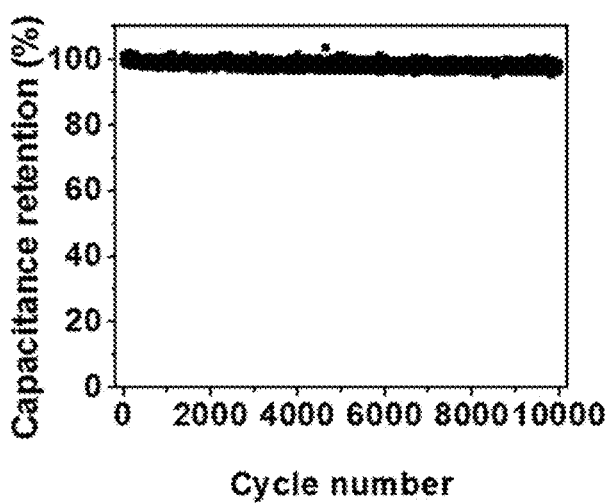

The thickness of the electrodes affects the device performance, especially for SC-G-2000. The volumetric capacitance of this device was 5.6 $F/cm^3$ at a current density of 0.25 $A/cm^3$. It decreased to 3.2 $F/cm^3$ when the current density increased to 10 $A/cm^3$, with only 57% capacitance retained, likely due to limited ion diffusion in the electrodes. This conclusion is further supported by the observation that devices with thinner electrodes exhibit higher volumetric capacitance (FIG. 8B). Electrodes thinner than 40 nm, however, show a decrease in volumetric capacitance, possibly due to limited electrical conductance in the plane of the film. The cycling stability of these sandwich-structure supercapacitors was also evaluated through extended galvanostatic charge-discharge experiments, as shown in FIG. 4F and FIG. 9. After 10,000 cycles of charge-discharge sweeps, no systematic decay in capacitance is observed for these devices, confirming their excellent cycling stability.

Figure 4G:
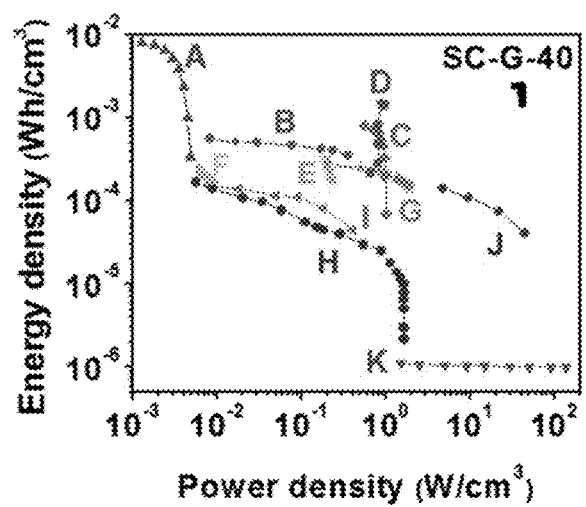

FIG. 4G and FIG. 10 show Ragone plots of the volumetric energy density and power density of graphene supercapacitors, as well as a comparison with commercially available energy storage devices and recently reported results for solid-state supercapacitors. SC-G-40 yields the best performance, with an energy density of 2.47 mWh/cm$^3$ and power density of 40.3 W/cm$^3$. This energy density is much higher than typical commercial supercapacitors (2.75 V/44 mF and 5.5 V/100 mF), and even comparable to Li thin-film batteries (4 V/500 μAh), while the power density is more than 10 times higher than commercial SCs and more than 1,000 times higher than Li thin-film batteries. SC-G-40 also compares favorably to other reported carbon materials in solid-state devices such as ErGO, carbon nanofibers, MPG, and LSG, as well as pseudocapacitive materials such as CSC-CRC, HZM, and H—$TiO_2$@$MnO_2$//H—$TiO_2$—C. These competitive metrics, coupled with design simplicity and processing advantages, support the promise of our printable graphene electrodes for practical applications.

Graphene films cast from a pristine graphene ink show desirable performance in sandwich-structured SCs, as discussed above. A key advantage of this material is its broad process compatibility, particularly its versatility for different solution-phase patterning methods. For example, G/EC inks have been developed for inkjet printing, a prevalent additive manufacturing technology with numerous benefits including digital, non-contact, and low-waste patterning. In an effort to exploit these advantages, microsupercapacitors with inkjet-printed interdigitated graphene electrodes were fabricated on flexible polyimide substrates, as illustrated in FIG. 11. In particular, the graphene ink was inkjet printed onto polyimide to form a G/EC pattern containing 12 in-plane interdigitated electrodes (6 per polarity). Following removal of the EC, PVA-$H_3PO_4$ was cast onto the surface of the graphene patterns to complete fabrication of the MSCs. The digital image in FIG. 11 shows one complete device, labeled as MSC-G. The graphene patterns can be printed in scale, offering compelling prospects for practical utility (FIG. 12).

Figure 13A:
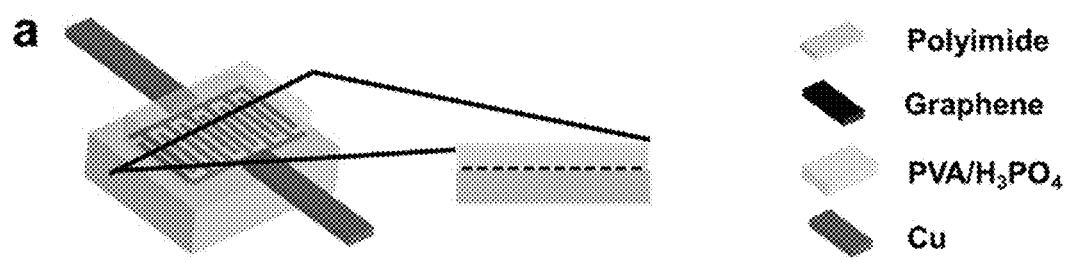
Figure 13B:
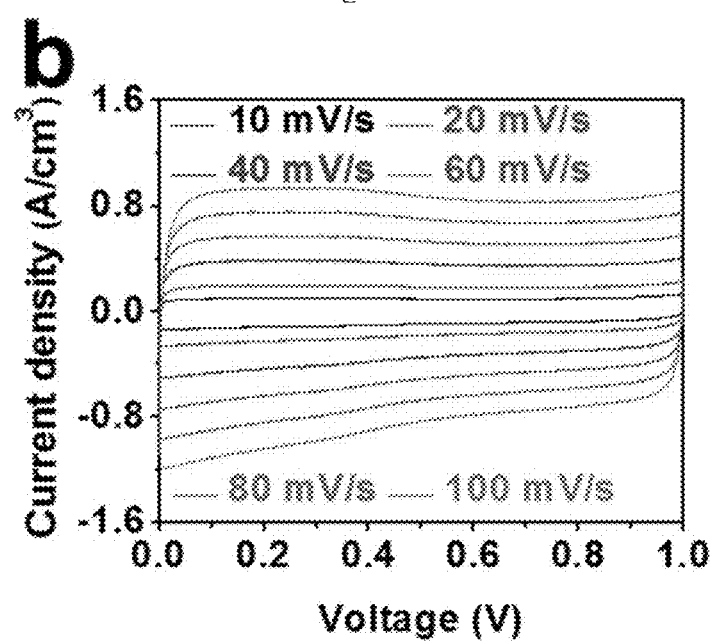
Figure 13C:
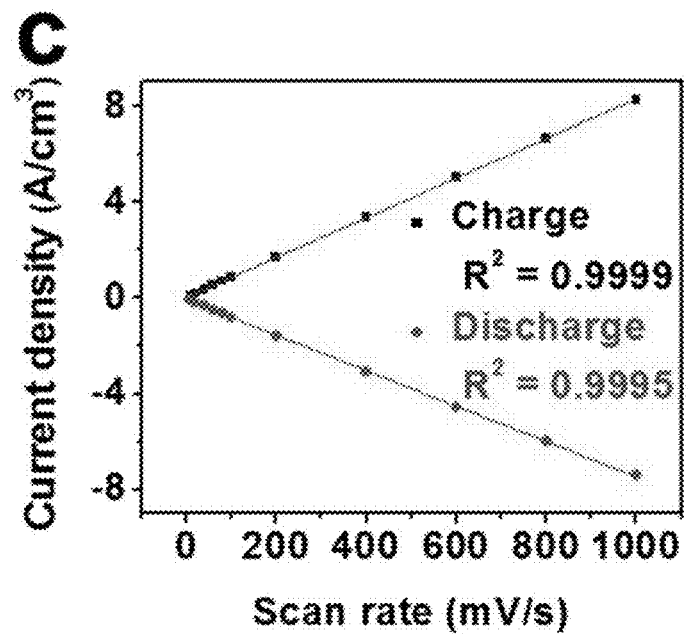
Figure 13D:
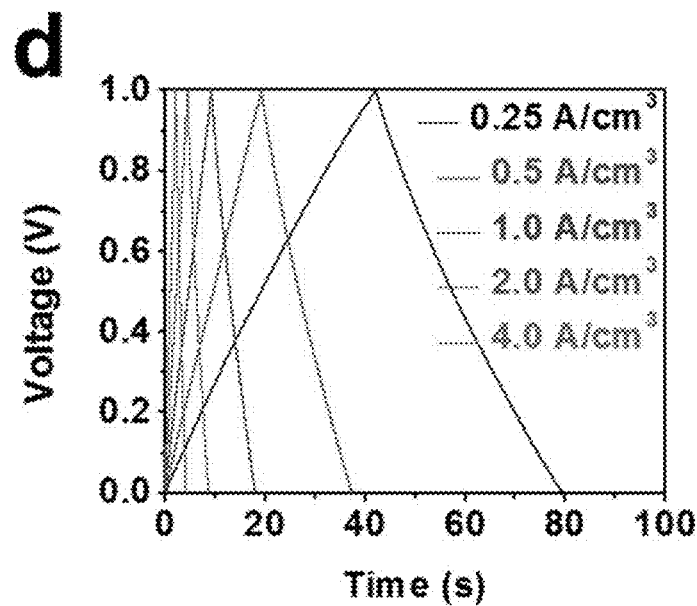
Figure 13E:
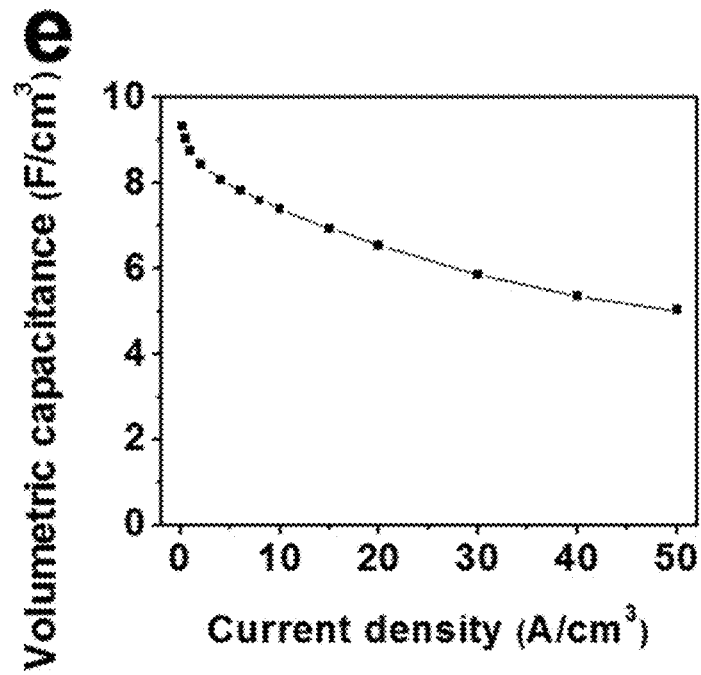

CV and galvanostatic charge-discharge experiments were carried out to evaluate the electrochemical performance of MSC-G (FIG. 13A). The nearly rectangular shape of the CV curves (FIG. 13B and FIG. 14A), strong linear relationship between capacitive current and scan rates (FIG. 13C), and symmetric triangular charge-discharge curves (FIG. 13D and FIG. 14B) demonstrate the desirable capacitive behavior of these devices. Based on the charge-discharge experiments, the volumetric capacitance of the devices was measured. As shown in FIG. 13E, the volumetric capacitance of the device was 9.3 F/cm$^3$ at a current density of 0.25 A/cm$^3$, and decreased to 5.0 F/cm$^3$ when the current density increased to 50 A/cm$^3$. This capacitance retention of greater than 54% for a corresponding current increase by a factor of 200 indicates reasonable rate performance, especially for a MSC. Importantly, the volume used in this capacitance calculation includes the space between the electrodes, thereby reflecting both the intrinsic performance of the graphene electrode and the fabrication tolerance and resolution; as such, it is expected that this capacitance is reduced from the sandwich-structure SCs (FIG. 15).

Figure 13F:
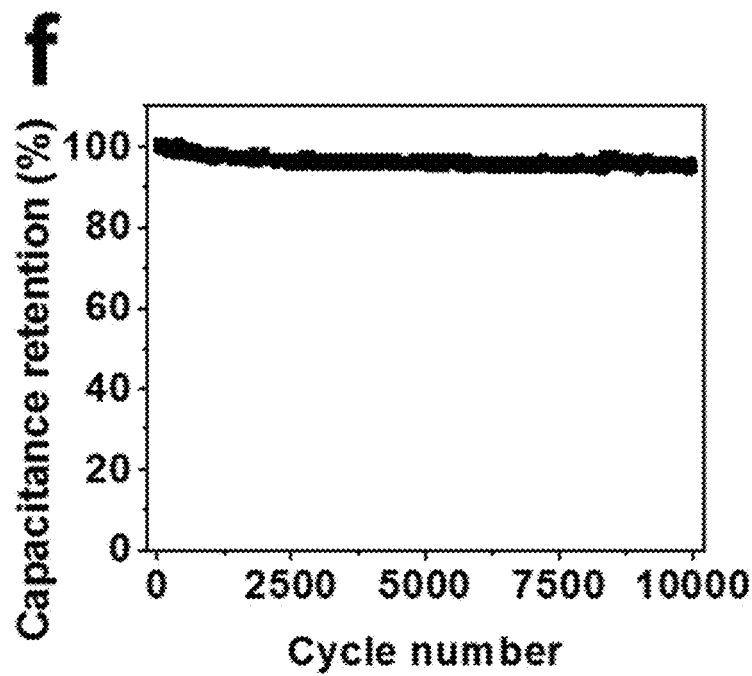
Figure 13G:
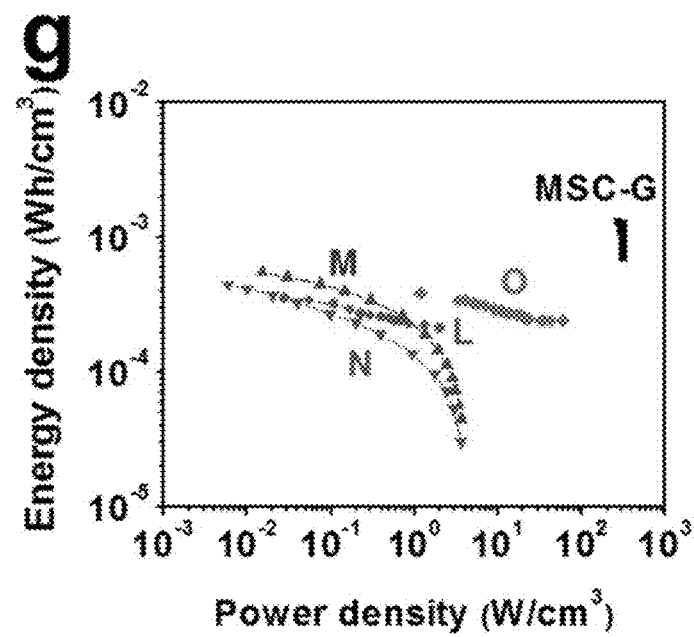

The cycling stability of MSC-G was evaluated by extended galvanostatic charge-discharge measurements. As shown in FIG. 13F, minimal capacitance decay is observed after 10,000 cycles, indicating the excellent operational stability of the device. Volumetric energy and power density of MSC-G were also evaluated (1.29 mWh/cm$^3$ and 278 W/cm$^3$, respectively), and are shown in FIG. 13G along with corresponding data for recent literature reports of carbon-based electrodes, indicating excellent performance for the G/EC MSCs in this broader context. MSC fabrication commonly uses expensive lithography for electrode patterning, the addition of conductive agents or separate current collectors, and often requires high temperature and multi-step synthetic processes. As illustrated herein, the fabrication of the electrodes is achieved through inkjet printing of graphene ink and subsequent EC removal by modest annealing in ambient atmosphere, representing a key processing advantage over alternative methods for MSC fabrication.

Figure 16A:
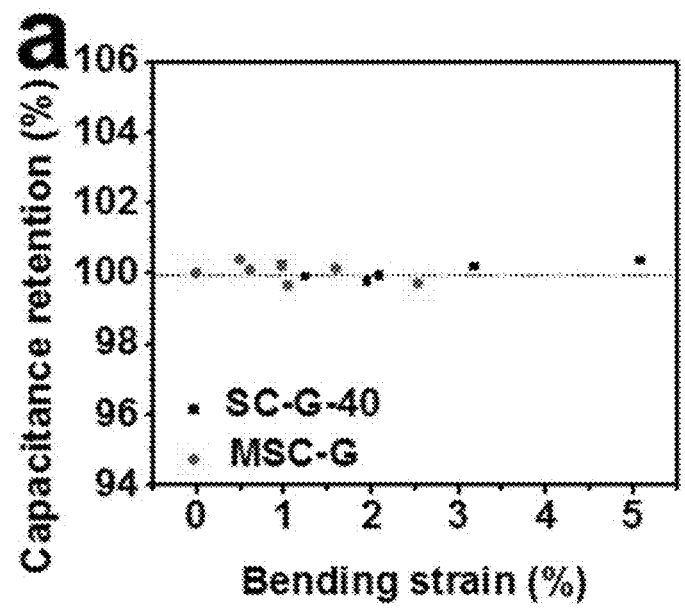
Figure 16B:
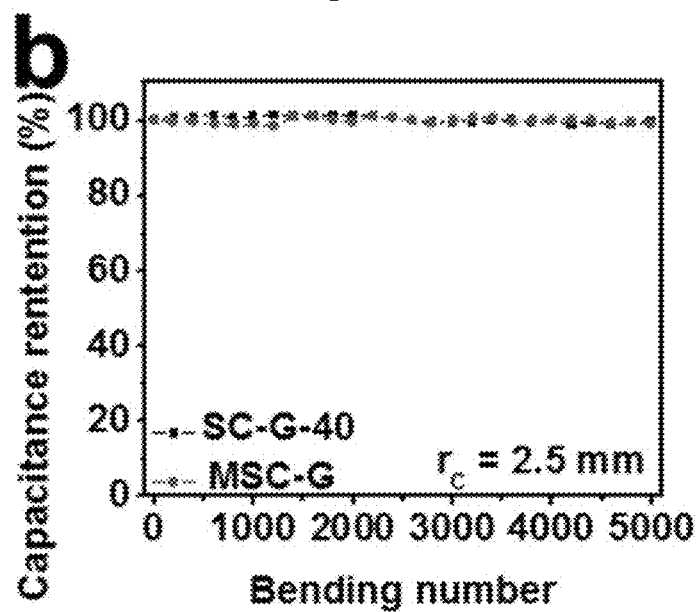

The ability to fabricate graphene MSCs in a shared processing platform with printed electronics motivates their application in powering flexible, portable devices. Towards that end, the durability of these devices under mechanical deformation is critical for reliable long-term operation. The device design presented here offers several advantages for mechanical durability. Notably, films of G/EC have been demonstrated to exhibit excellent resilience to extreme bending and even discrete folding, with minimal degradation in electrical performance. In addition, by employing the highly conductive G/EC as both the current collector and electrode, the number of interfaces in the device is reduced. Materials and interfaces introduced with traditional metal current collectors can present mechanically weak points in terms of electrode fracture and delamination. To evaluate these potential advantages, the performance of SC-G-40 and MSC-G was studied under bending mechanical strain. The nearly invariant capacitance measured at different strain states indicates the stable operation of the devices under this mechanical deformation (FIG. 16A and FIG. 17). Moreover, when flexed repeatedly to a radius of curvature of 2.5 mm, corresponding to bending strains of 5.1 and 2.5% for the SC and MSC, respectively, these devices show desirable mechanical tolerance with no systematic capacitance decay over 5,000 bending cycles, as shown in FIG. 16B.

Figure 16C:
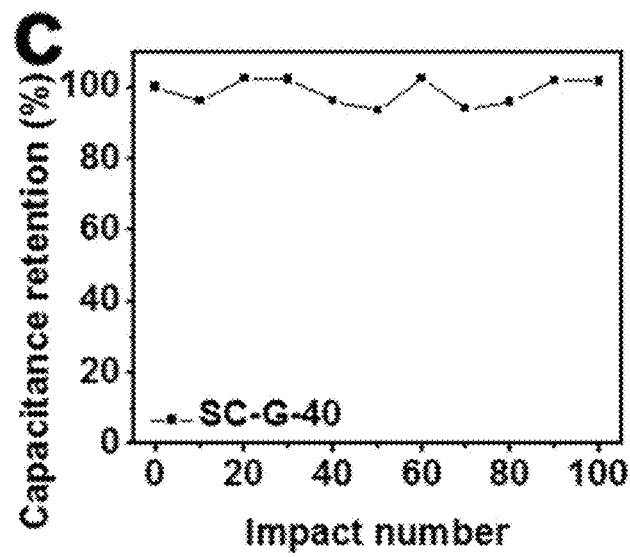
Figure 16D:
Figure 16D:
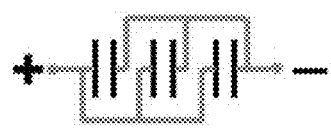
Figure 16E:
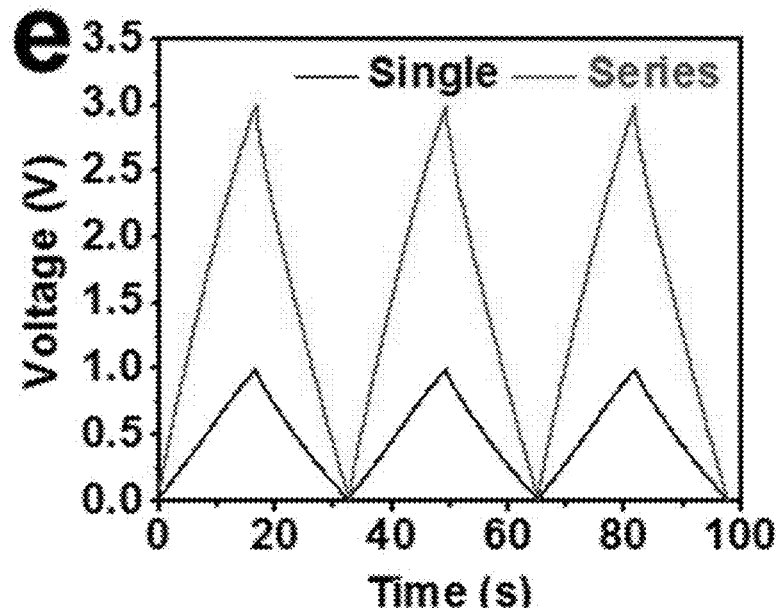
Figure 16F:
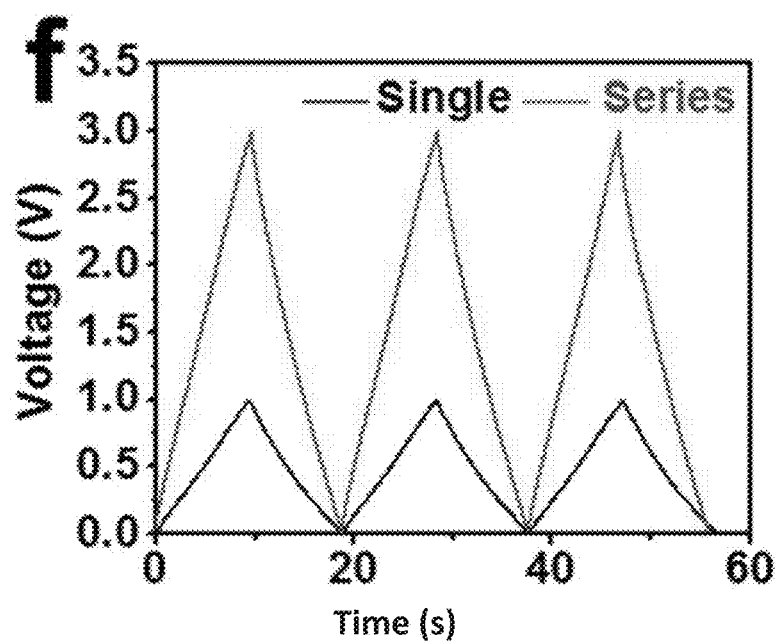
Figure 16G:
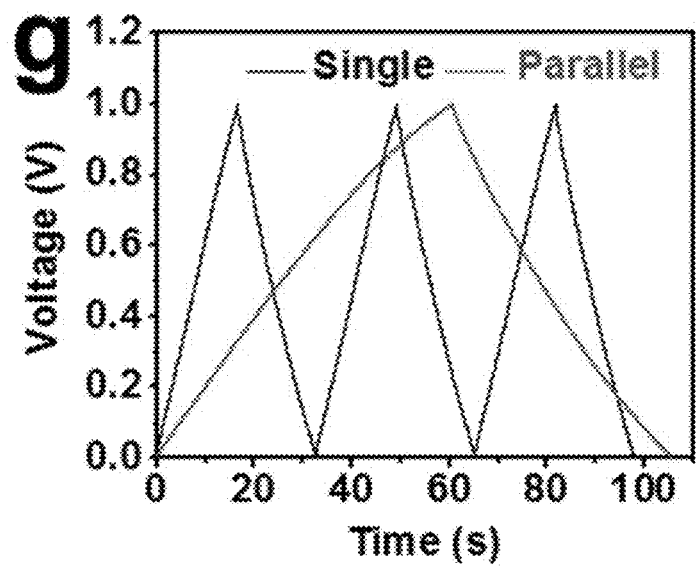
Figure 16H:
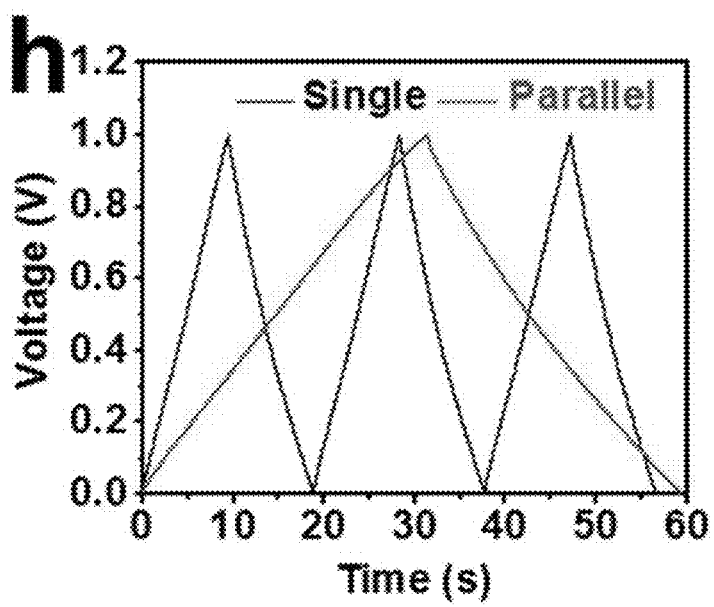

In addition to bending tolerance, devices for portable energy storage applications require sufficient robustness to provide reliable operation under abrupt mechanical impact. To demonstrate the suitability of the design presented here, electrochemical performance was evaluated following repeated impact, applied with a hammer swinging apparatus with ~2 J of energy. As shown in FIG. 16C, no systematic change in performance of a graphene SC is observed over 100 cycles of repeated impact. The combination of bending tolerance and impact resistance reinforces the suitability of these devices for flexible and portable energy storage applications. In addition, to meet the specific energy and power needs for practical applications, multiple SC-G-40 and MSC-G can be assembled in series or parallel configurations (FIG. 16D). When three devices are connected in series, it results in an increased voltage window by a factor of 3, with a similar discharge time for a given current (FIG. 16E,F). Compared with a single device, the discharge time of three devices connected in parallel increases by more than 3 times compared to that of a single device at the same current (FIG. 16G,H), indicating that these devices can be combined in series or parallel to tailor the voltage or working time.

EXAMPLES OF THE INVENTION

The following non-limiting examples and data illustrate various aspects and features relating to the devices and/or methods of the present invention, including the fabrication of various capacitor devices, as are available through the methodologies described herein. In comparison with the prior art, the present methods and devices provide results and data which are surprising, unexpected and contrary thereto. While the utility of this invention is illustrated through the use of several devices and graphene electrode, substrate and electrolyte components which can be used therewith, it will be understood by those skilled in the art that comparable results are obtainable with various other devices and electrode, substrate and electrolyte components, are commensurate with the scope of this invention.

Example 1

Synthesis of G/EC: Graphene was produced by high shear mixing of graphite in a solution of ethyl cellulose and ethanol. Ethyl cellulose (EC, Sigma-Aldrich, 4 cP grade measured in 80:20 toluene:ethanol at 5% wt., 48% ethoxy) was dissolved in ethanol (Koptec, 200 proof) at a concentration of 10 mg/mL. Flake graphite (Asbury Graphite Mills, Grade 3061) was added at a concentration of 200 mg/mL. This mixture (~1 L total volume) was mixed with a high shear mixer (Silverson L5M-A) for 2 hours at 10,230 rpm in an ice water bath. Unexfoliated graphite flakes were removed by centrifugation (Beckman Coulter Avanti® J-26 XPI centrifuge) at 7,500 rpm for 5 minutes and then 4,000 rpm for 105 minutes. The supernatant was collected and flocculated by mixing with an aqueous solution of NaCl (Sigma-Aldrich, 0.04 g/mL) in a 16:9 wt. ratio. Centrifugation at 7,500 rpm for 6 minutes was performed to collect the flocculated G/EC solid, and the ethanol and excess EC was discarded. Finally, the G/EC solid was washed with deionized water to remove residual salt and dried.

Example 2

Fabrication of the sandwich-structured SCs and MSCs: Graphene supercapacitors were prepared by spin-coating, blade-coating processes and inkjet printing. Various other graphene/ethyl cellulose ink compositions can be prepared and utilized in conjunction with the present invention, such compositions and methods of the sort described in co-pending application Ser. No. 14/756,304 filed on Aug. 24, 2015 and Ser. No. 14/699,822 filed on Apr. 29, 2015, each of which is incorporated herein by reference.

Example 2a

For blade-coating thick graphene films, G/EC powder was dispersed in ethanol and terpineol by bath sonication. Excess ethanol was removed by heating to yield a nominal ink composition of 20% w/v G/EC in terpineol. This paste was doctor-bladed onto 125 μm thick polyimide substrates to form uniform films. Following EC removal by thermal annealing, the graphene film thickness was ~2000 nm.

Example 2b

For spin-coating thin graphene films, 0.2 mL of blade-coating ink was diluted in 0.5 mL ethanol. This spin-coating ink was cast into films on polyimide with a spin speed of 1,000 to 5,000 rpm. Films were thermally annealed at 350° C. for 4 hours to remove the EC prior to electrolyte deposition. Polymeric gel electrolyte of PVA/H$_3$PO$_4$ was prepared by stirring 9 mL of deionized water, 1.0 mL of phosphoric acid (85%, Sigma-Aldrich), and 1.0 g of PVA=50,000, Aldrich) at 80° C. The electrolyte was deposited on the active area of the devices, and was dried under ambient conditions for 4 h. The all-solid-state SCs were obtained after drying in a vacuum desiccator overnight for further solidification of the electrolyte.

Example 2c

Graphene microsupercapacitors were prepared by inkjet printing. G/EC powder was dispersed at a concentration of 30 mg/mL in a solvent system containing 80:15:5 v/v cyclohexanone, terpineol, and di(ethylene glycol) methyl ether (Sigma-Aldrich). Following bath sonication to disperse the powder, the ink was passed through a 3.1 μm glass fiber syringe filter to prevent nozzle clogging and promote stable printing. A Ceradrop X-Serie inkjet printer equipped with a 10 μL Dimatix cartridge (DMC-11610) was used to print the ink using a custom waveform to form the interdigitated electrode structure of the MSCs. All electrodes were printed on 125 μm thick polyimide and annealed at 350° C. for 4 hours prior to electrolyte deposition. The same process for the electrolyte as discussed for SCs was used for MSCs.

Example 3

Electrochemical characterization: The electrochemical performance of SCs and MSCs were characterized by CV and galvanostatic charge-discharge experiments (CHI 660D). The volumetric capacitance ($C_V$) of electrode materials were calculated based on galvanostatic charge-discharge curves according to eq 1:

$$C_V = 4I/(V_{Device} \times (dV/dt)) \quad (1)$$

where I is the current applied, $V_{Device}$ is the total volume of the device, and dV/dt is the slope of the discharge curve.
The volumetric capacitance ($C_{Device,V}$) of SCs and MSCs devices were calculated by using eq 2:

$$C_{Device,V} = C_V/4 \quad (2)$$

The volumetric energy density ($E_{Device,V}$) of SCs and MSCs were calculated by using eq 3:

$$E_{Device,V} = C_{Device,V} V^2/(2 \times 3600) \quad (3)$$

where V is the applied voltage.
The volumetric power density ($P_{Device,V}$) of SCs and MSCs were calculated by using eq 4:

$$P_{Device,V} = V^2/4R_{ESR}V_{Device} \quad (4)$$

where $R_{ESR}$ is the internal resistance of the device, which is estimated from the voltage drop ($V_{Drop}$) at the beginning of the discharge at a constant current (I) according to eq 5:

$$R_{ESR} = V_{Drop}/2I \quad (5)$$

As demonstrated, the present invention provides a route for the fabrication of all-solid-state flexible SCs and MSCs using a solution-processed pristine graphene ink. The graphene electrodes demonstrate superlative electrical, electrochemical, and mechanical properties, along with desirable process compatibility. Specifically, the solid-state flexible devices exhibit high volumetric capacitance, promising energy and power densities, and excellent cycling stability and mechanical durability. These results provide a compelling platform to simplify energy storage device fabrication processes, with promise for scalable manufacturing, digital device design, and direct integration with printed electronic systems. Overall, the design strategy discussed here offers a new avenue for producing robust, high-performance, all-solid-state flexible energy storage devices in a scalable, straightforward, and versatile process.

We claim:
1. A method of fabricating a graphene capacitor, said method comprising:
providing a graphene ink composition comprising graphene, an ethyl cellulose and an ink solvent, said graphene ink composition not prepared from graphene oxide, wherein said ink solvent comprises 80:15:5 v/v cyclohexanone, terpineol and di(ethylene glycol) methyl ether;

depositing said graphene ink composition on a substrate;

annealing said graphene ink composition to decompose said ethyl cellulose and provide an electrode component comprising graphene; and coupling an electrolyte and a metallic lead component to said electrode component, to provide said graphene capacitor, wherein said capacitor is absent a separate current collector component.

2. The method of claim 1 wherein said deposition comprises inkjet printing said graphene ink composition on said substrate, to provide a microsupercapacitor.

3. The method of claim 1 wherein said deposition is selected from blade coating and spin coating said graphene ink composition on said substrate.

4. The method of claim 1 wherein two said capacitors are in a sandwich configuration to provide a supercapacitor such that two said electrode components, two said electrolytes and two said metallic lead components are positioned between two said substrates.

5. The method of claim 1 wherein said electrolyte is dried to provide an all solid-state capacitor.

6. The method of claim 1 wherein said deposition is on a flexible polymeric substrate.

7. The method of claim 1 wherein said provision of said ink composition comprises:

exfoliating a graphene source material with a medium comprising an organic solvent at least partially miscible with water, and an ethyl cellulose dispersing agent at least partially soluble in said organic solvent;

contacting at least a portion of said exfoliated graphene medium with an aqueous medium to concentrate exfoliated graphene in a solid composition comprising graphene and said ethyl cellulose;

isolating said solid composition from said media; and contacting said solid composition with said ink solvent.

8. The method of claim 1 wherein a plurality of said capacitors are arranged in a configuration selected from series and parallel configurations.

9. The method of claim 1 wherein said annealing said graphene ink composition is performed at 350° C. for 4 hours.

* * * * *